United States Patent
Nakadai et al.

(10) Patent No.: US 11,396,308 B2
(45) Date of Patent: Jul. 26, 2022

(54) VEHICLE CONTROL SYSTEM, SELF-DRIVING VEHICLE, VEHICLE CONTROL METHOD, AND PROGRAM

(71) Applicant: NEC Corporation, Tokyo (JP)

(72) Inventors: Shinji Nakadai, Tokyo (JP); Satoshi Morinaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 121 days.

(21) Appl. No.: 16/499,369

(22) PCT Filed: Mar. 30, 2017

(86) PCT No.: PCT/JP2017/013272
§ 371 (c)(1),
(2) Date: Sep. 30, 2019

(87) PCT Pub. No.: WO2018/179235
PCT Pub. Date: Oct. 4, 2018

(65) Prior Publication Data
US 2021/0101617 A1    Apr. 8, 2021

(51) Int. Cl.
*H04W 4/46* (2018.01)
*B60W 60/00* (2020.01)

(52) U.S. Cl.
CPC .......... *B60W 60/0015* (2020.02); *H04W 4/46* (2018.02); *B60W 2520/06* (2013.01); *B60W 2556/65* (2020.02); *B60W 2756/10* (2020.02)

(58) Field of Classification Search
CPC ......... B60W 60/0015; B60W 2756/10; B60W 2520/06; B60W 2556/65; H04W 4/46
See application file for complete search history.

(56) References Cited

U.S. PATENT DOCUMENTS

| | | | |
|---|---|---|---|
| 2017/0116854 A1* | 4/2017 | Sugawara | G08G 1/0141 |
| 2018/0079419 A1 | 3/2018 | Yamamoto | |
| 2019/0098471 A1* | 3/2019 | Rech | H04W 4/02 |

FOREIGN PATENT DOCUMENTS

| | | | | |
|---|---|---|---|---|
| JP | H11-110693 A | 4/1999 | | |
| JP | 2015-072650 A | 4/2015 | | |
| JP | 2015-106326 A | 6/2015 | | |
| JP | WO2016147622 A1 * | 12/2017 | | G08G 1/162 |
| WO | 2016/147622 A1 | 9/2016 | | |

OTHER PUBLICATIONS

English_Translation_JPWO2016147622A1 (Year: 2016).*
International Search Report for PCT Application No. PCT/JP2017/013272, dated Jun. 27, 2017.

* cited by examiner

*Primary Examiner* — Peter D Nolan
*Assistant Examiner* — Ashley L Redhead, Jr.
(74) *Attorney, Agent, or Firm* — Sughrue Mion, PLLC

(57) ABSTRACT

The target setting unit 7 sets a target state of the self-driving vehicle 10. The planned route creating unit 3 creates a planned route of the self-driving vehicle 10 for realizing the target state. The transmission unit 6 transmits the planned route to another vehicle. The response receiving unit 9 receives, from another vehicle, a notification indicating agreement with the planned route or disagreement with the planned route as a response to the planned route. The traveling control unit 8 controls the self-driving vehicle 10 so as to cause the self-driving vehicle 10 to travel along the planned route when the response receiving unit 9 has received the notification indicating agreement with the planned route.

8 Claims, 23 Drawing Sheets

FIG. 2
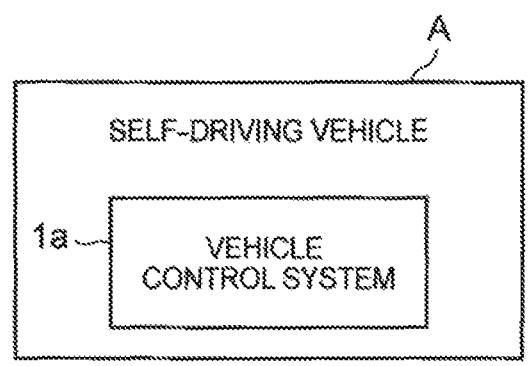
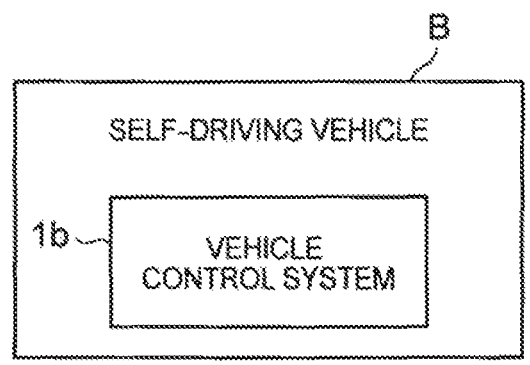

VEHICLE CONTROL SYSTEM, SELF-DRIVING VEHICLE, VEHICLE CONTROL METHOD, AND PROGRAM

This application is a National Stage Entry of PCT/JP2017/013272 filed on Mar. 30, 2017, the contents of all of which are incorporated herein by reference, in their entirety.

TECHNICAL FIELD

The present invention relates to a vehicle control system, a self-driving vehicle, a vehicle control method, and a vehicle control program.

BACKGROUND ART

PTL 1 describes that when vehicles change lanes or join together by automatic driving, the vehicles perform the traveling operation after communicating with each other for safety confirmation by inter-vehicle communication in advance. In the technology described in PTL 1, a lane change vehicle that is going to change lanes transmits a lane change request signal to a following vehicle traveling on the destination lane. Upon receipt of the lane change request signal, the following vehicle determines whether to allow lane change depending on whether the inter-vehicle distance between the following vehicle and the lane change vehicle is equal to or less than a predetermined threshold value, and transmits a permission response to the lane change vehicle when permitting the lane change. The lane change vehicle actually changes lanes when determining that a permission response to the lane change request has been received from the following vehicle.

In addition, PTL 2 describes that a right-turning vehicle and a straight-running vehicle perform two-way communication, and exchange information on the priority of passage. The right-turning vehicle counts up the priority of the host vehicle according to the waiting time, and when the priority becomes higher than that of the straight-running vehicle, it asks for a passage permission from the straight-running vehicle. Then, when notified of the passage permission from the straight-running vehicle, the right-turning vehicle turns right at the intersection. The traffic control device of the straight-running vehicle that has permitted the passage of the right-turning vehicle automatically operates the brake system to stop the host vehicle without via the driver's judgment. Then, the straight-running vehicle stands by until it receives notification of passing the intersection from the right-turning vehicle.

CITATION LIST

Patent Literature

PTL 1: International Publication No. 2016/147622
PTL 2: Japanese Patent Application Laid-Open No. 11-110693

SUMMARY OF INVENTION

Technical Problem

In the technology described in PTL 1, the following vehicle determines whether to permit lane change using a predetermined threshold value. In this case, depending on the situation, a smooth traffic flow may not be realized.

According to the technology described in PTL 2, while the right-turning vehicle is turning to the right, the straight-running vehicle must be on standby. For this reason, in some cases, it may not be possible to realize a smooth traffic flow.

Therefore, the present invention aims at providing a vehicle control system, a self-driving vehicle, a vehicle control method, and a vehicle control program which can realize a smooth traffic flow.

Solution to Problem

A vehicle control system according to the present invention is a vehicle control system provided in a self-driving vehicle, the vehicle control system including: a target setting unit that sets a target state of the self-driving vehicle; a planned route creating unit that creates a planned route of the self-driving vehicle for realizing the target state; a traveling control unit that controls the self-driving vehicle so as to cause the self-driving vehicle to travel along the planned route; a transmission unit that transmits the planned route to another vehicle; and a response receiving unit that receives, from the other vehicle, a notification indicating agreement with the planned route or disagreement with the planned route, as a response to the planned route, in which the traveling control unit, when the response receiving unit has received a notification indicating agreement with the planned route, controls the self-driving vehicle so as to cause the self-driving vehicle to travel along the planned route.

Further, a vehicle control system according to the present invention is a vehicle control system provided in a self-driving vehicle, the vehicle control system including: a planned route creating unit that creates a planned route of the self-driving vehicle; a non-traveling area plan creating unit that creates a plan of a non-traveling area, which is an area where the self-driving vehicle can travel and which is an area set as an area where the self-driving vehicle does not travel; a transmission unit that transmits the plan of the non-traveling area to another vehicle; and a response receiving unit that receives, from the other vehicle, information on a partial area, which is an area within the non-traveling area and which the other vehicle has agreed with as the non-traveling area of the self-driving vehicle, in which the planned route creating unit, when creating the planned route again after receiving the information on the partial area, creates the planned route in an area other than the partial area.

Further, a self-driving vehicle according to the present invention includes the above-described vehicle control system.

Further, a vehicle control method according to the present invention, by a computer provided in a self-driving vehicle, includes: setting a target state of the self-driving vehicle; creating a planned route of the self-driving vehicle for realizing the target state; transmitting the planned route to another vehicle; receiving, from the other vehicle, a notification indicating agreement with the planned route or disagreement with the planned route, as a response to the planned route; and controlling the self-driving vehicle so as to cause the self-driving vehicle to travel along the planned route, when the notification indicating agreement with the planned route is received.

Further, a vehicle control method according to the present invention, by a computer provided in a self-driving vehicle, includes: creating a planned route of the self-driving vehicle; creating a plan of a non-traveling area, which is an area where the self-driving vehicle can travel and which is an area set as an area where the self-driving vehicle does not travel; transmitting the plan of the non-traveling area to another vehicle; receiving, from the other vehicle, information on a partial area, which is an area within the non-traveling area and which the other vehicle has agreed with as the non-traveling area of the self-driving vehicle; and creating the planned route in an area other than the partial area when creating the planned route again after receiving the information on the partial area.

Further, a vehicle control program according to the present invention is a vehicle control program installed on a computer provided in a self-driving vehicle, the vehicle control program for causing the computer to execute: target setting processing for setting a target state of the self-driving vehicle; planned route creation processing for creating a planned route of the self-driving vehicle for realizing the target state; traveling control processing for controlling the self-driving vehicle so as to cause the self-driving vehicle to travel along the planned route; transmission processing for transmitting the planned route to another vehicle; and response receiving processing for receiving, from the other vehicle, a notification indicating agreement with the planned route or disagreement with the planned route, as a response to the planned route, in which the traveling control processing, when the response receiving processing has received a notification indicating agreement with the planned route, controls the self-driving vehicle so as to cause the self-driving vehicle to travel along the planned route.

Further, a vehicle control program according to the present invention is a vehicle control program installed on a computer provided in a self-driving vehicle, the vehicle control program for causing the computer to execute: planned route creation processing for creating a planned route of the self-driving vehicle; non-traveling area plan creation processing for creating a plan of a non-traveling area, which is an area where the self-driving vehicle can travel and which is an area set as an area where the self-driving vehicle does not travel; transmission processing for transmitting the plan of the non-traveling area to another vehicle; and response receiving processing for receiving, from the other vehicle, information on a partial area, which is an area within the non-traveling area and which the other vehicle has agreed with as the non-traveling area of the self-driving vehicle, in which the planned route creation processing, when creating the planned route again after receiving the information on the partial area, creates the planned route in an area other than the partial area.

Advantageous Effects of Invention

According to the present invention, a smooth traffic flow can be realized.

BRIEF DESCRIPTION OF DRAWINGS

FIG. 2 It depicts a schematic diagram showing a plurality of self-driving vehicles each provided with a vehicle control system.

DESCRIPTION OF EMBODIMENTS

Figure 1:
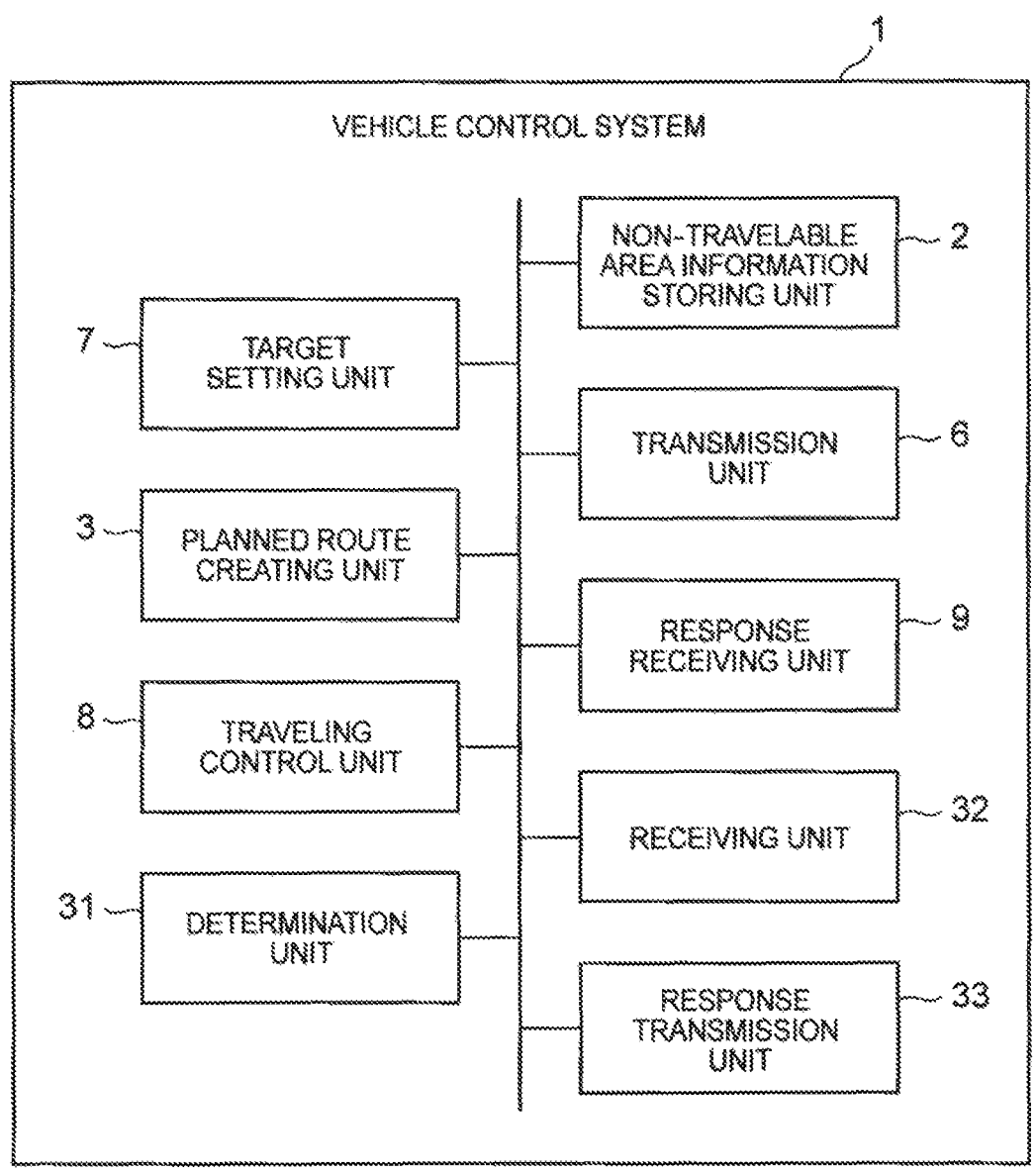
FIG. 1 It depicts a block diagram showing an example of a vehicle control system according to a first exemplary embodiment of the present invention.

An exemplary embodiment of the present invention will be described below with reference to drawings.

First, terms used to explain the present invention will be described.

In the present invention, a "self-driving vehicle" may be a car that the driver does not drive in any case while traveling, and may be a car driven by the driver in a case where the driver completely gives control to the car under a specific traffic condition and that specific traffic condition is not fulfilled. In the former case, it may be unattended.

Moreover, the "self-driving vehicle" of this invention can also be called an "autonomous traveling vehicle".

The "non-travelable area" is an area where the vehicle cannot travel physically or legally.

Specific examples of an area where a vehicle cannot travel physically include an area where there is an obstacle such as a telegraph pole, a position in a direction forming 90° with the traveling direction as the position after 0.1 seconds with respect to the current position, and a position at a distance of 10 meters or more from the current position as the position within 0.1 seconds in the traveling direction.

Further, specific examples of an area where a vehicle cannot legally travel include a sidewalk, a place inside a building or a park, an intersection of red lights, and a one-way road when traveling is reverse travel.

A "travelable area" is an area where a self-driving vehicle or a driver can travel physically and legally if it attempts to travel.

The "planned route" is a route planned by a self-driving vehicle as a traveling route. The self-driving vehicle sets a planned route within the travelable area. In the planned route, the time is associated with the position of the self-driving vehicle.

The "non-traveling area" is an area within the travelable area and set as an area where the self-driving vehicle does not travel. In other words, the "non-traveling area" is an area where the self-driving vehicle can travel and is an area set as an area where the self-driving vehicle does not travel.

The non-traveling area is an area set as an area where the self-driving vehicle can travel but does not travel, and is distinguished from a "non-travelable area" where it is originally not possible to travel. That is, the non-traveling area does not overlap with the non-travelable area. The definition of such terms is not intended to exclude the manner in which the self-driving vehicle described later transmits and receives an area including the non-traveling area and the non-travelable area.

The vehicle system of the present invention is provided in a self-driving vehicle and controls traveling of the self-driving vehicle. The vehicle system of the present invention executes "mission planning", "motion planning", and "control" as the operation of creating a plan for traveling of a self-driving vehicle.

The "mission planning" is, for example, an operation of setting a mission such as "turn right", "change lanes to left lane", "stop", "turn around", or the like. The mission may be referred to as a target state.

The "motion planning" is an operation of creating a planned route so as to achieve a mission, which is an output of mission planning.

The "control" is an operation of creating control information for controlling an accelerator, a brake, a steering, etc., so that a self-driving vehicle travels along a planned route.

The vehicle system of the present invention, for example, performs "mission planning" at 2 Hz, for example, performs "motion planning" at 25 Hz, and performs "control" at 10 Hz, for example.

First Exemplary Embodiment

FIG. 1 is a block diagram showing an example of a vehicle control system according to a first exemplary embodiment of the present invention. A vehicle control system 1 according to the first exemplary embodiment includes a non-travelable area information storing unit 2, a target setting unit 7, a planned route creating unit 3, a transmission unit 6, a response receiving unit 9, a traveling control unit 8, a determination unit 31, a receiving unit 32, and a response transmission unit 33.

FIG. 2 is a schematic diagram showing a plurality of self-driving vehicles each provided with the vehicle control system 1. Although two self-driving vehicles A and B are illustrated in FIG. 2, the number of self-driving vehicles each provided with the vehicle control system 1 is not limited. Hereinafter, in order to simplify the description, the description will be made using two self-driving vehicles A and B as appropriate. The vehicle control system 1 provided in the self-driving vehicle A and the vehicle control system 1 provided in the self-driving vehicle B have the same configuration (see FIG. 1). In addition, when the vehicle control system 1 provided in the self-driving vehicle A and the vehicle control system 1 provided in the self-driving vehicle B are distinguished, the former is represented by adding a suffix "a" to the code "1" and the latter is represented by adding a suffix "b" to the code "1" (see FIG. 2). Similarly, with regard to each element in the vehicle control system 1 such as the planned route creating unit 3, the suffix "a" is added to the code when explicitly indicating that the element is provided in the self-driving vehicle A, and the suffix "b" is added to the code when explicitly indicating that the element is provided in the self-driving vehicle B. In the case where there is no need to distinguish between the self-driving vehicles A and B, the elements are represented without adding the suffix "a" or "b" to the codes. These points are the same as in the second exemplary embodiment described later.

The non-travelable area information storing unit 2 is a storage device for storing information (for example, information indicating an area where a sidewalk, a building, etc. exist) indicating the non-travelable area, and information (for example, information indicating an area of a one-way road) indicating an area that can become a non-travelable area depending on the state (for example, a traveling direction) of a self-driving vehicle or the like.

The target setting unit 7 sets a target state (mission) of the self-driving vehicle provided with the target setting unit 7. For example, the target setting unit 7 sets missions such as "turn right", "change lanes to left lane", "stop", "turn around", and the like. The target setting unit 7 may set the mission according to, for example, information (a destination, a condition of a signal, etc.) given from the outside. The operation of the target setting unit 7 corresponds to the above-mentioned "mission planning". The target setting unit 7 sets a mission at 2 Hz, for example.

The planned route creating unit 3 creates a planned route of the self-driving vehicle on which the vehicle control system 1 is mounted, in accordance with the mission set by the target setting unit 7. Creation of a planned route corresponds to the above-mentioned "motion planning". Here, for descriptive purposes, the description will be given assuming that the self-driving vehicle having the vehicle control system 1 mounted thereon is the self-driving vehicle A. The planned route creating unit 3 creates a planned route at 25 Hz, for example.

The planned route creating unit 3 refers to the non-travelable area information storing unit 2 and specifies the non-travelable area. Furthermore, the planned route creating unit 3 determines that the area other than the non-travelable area is the travelable area. The planned route creating unit 3 creates a planned route within the travelable area. The planned route creating unit 3 creates, as a planned route, a planned route including information indicating the correspondence between the time of day and the position of the self-driving vehicle A.

The planned route creating unit 3 may create a planned route using a known algorithm, for example, such as Rapidly-Exploring Random Trees (RRT) or A-star (A*). The algorithm used to create the planned route is not limited to RRT or A*.

Figure 3:
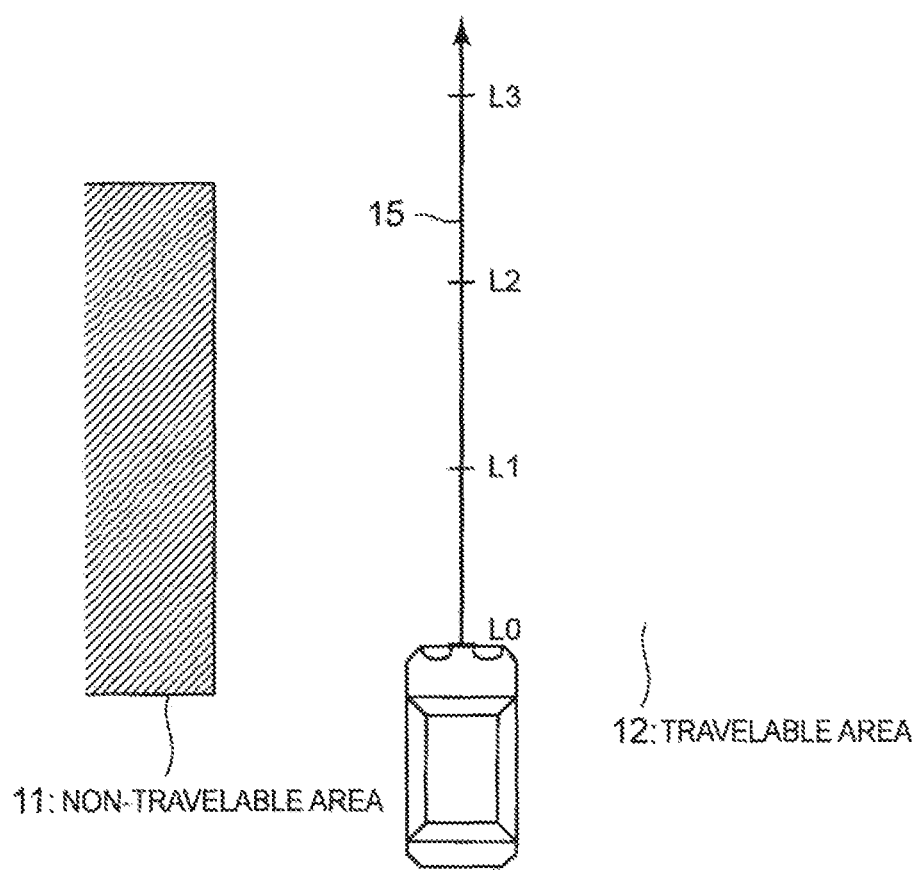
FIG. 3 It depicts a schematic diagram showing an example of a planned route.

FIG. 3 is a schematic diagram showing an example of a planned route. An area other than the non-travelable area 11 is a travelable area 12. The planned route creating unit 3 creates a planned route 15 within the travelable area 12. Although, for ease of explanation, FIG. 3 shows the case where the planned route 15 is a straight line, the planned route 15 may be a curve. In addition, t0 is the current time. t1, t2, and t3 are future times. In the example shown in FIG. 3, L0 is the position of the self-driving vehicle A at the current time t0. L1 is the position of the self-driving vehicle A at time t1. L2 is the position of the self-driving vehicle A at time t2. L3 is the position of the self-driving vehicle A at time t3.

The transmission unit 6 broadcasts the planned route created by the planned route creating unit 3 to other self-driving vehicles existing in the vicinity. At this time, the transmission unit 6 also broadcasts the identification information of the self-driving vehicle A together with the planned route. This is to allow other self-driving vehicles having received the planned route to respond to the self-driving vehicle A. Here, the self-driving vehicle B will be described as an example of another self-driving vehicle existing in the vicinity.

The response receiving unit 9 receives, from the other self-driving vehicle B, a notification indicating agreement with the planned route or disagreement with the planned route, as a response to the transmitted planned route.

The traveling control unit 8 controls the self-driving vehicle A so as to cause the self-driving vehicle A to travel along the planned route created by the planned route creating unit 3. The traveling control unit 8 creates control information for each part (for example, an accelerator, a brake, etc.) of the self-driving vehicle A, and controls the self-driving vehicle A according to the control information. However, the traveling control unit 8, when the response receiving unit 9 receives, from another self-driving vehicle B, a notification indicating agreement with the planned route, as a response to the planned route transmitted by the control unit 6, controls the self-driving vehicle A so as to cause the self-driving vehicle A to travel along the planned route.

Note that, when the response receiving unit 9 has received, from the other self-driving vehicle B, a notification indicating disagreement with the planned route, the planned route creating unit 3 creates the planned route again.

Further, not only the vehicle control system 1*a* of the self-driving vehicle A, but also the vehicle control system 1*b* of the other self-driving vehicle B creates a planned route and transmits the planned route.

The receiving unit 32 receives the planned route and the identification information of the self-driving vehicle B broadcasted by the vehicle control system 1*b* of the other self-driving vehicle B.

The determination unit 31 determines whether to agree with the planned route of the other self-driving vehicle B on the basis of the planned route of the other self-driving vehicle B received by the receiving unit 32 and the planned route of the self-driving vehicle A created by the planned route creating unit 3. For example, if the planned route of the self-driving vehicle B and the planned route of the self-driving vehicle A do not intersect, the determination unit 31 determines to agree with the planned route of the self-driving vehicle B. If the planned route of the self-driving vehicle B intersects with the planned route of the self-driving vehicle A, the determination unit 31 determines not to agree with the planned route of the self-driving vehicle B. However, the determination method of the determination unit 31 is not limited to the above example, and the determination unit 31 may perform the determination by another method.

The response transmission unit 33 transmits the response to the planned route of the self-driving vehicle B received by the receiving unit 32 to the self-driving vehicle B by the unicast method according to the determination result of the determination unit 31. When the determination unit 31 has determined to agree with the planned route of the self-driving vehicle B, the response transmission unit 33 transmits, to the self-driving vehicle B, a notification indicating agreement with the planned route of the self-driving vehicle B. Further, when the determination unit 31 has determined not to agree with the planned route of the self-driving vehicle B, the response transmission unit 33 transmits, to the self-driving vehicle B, a notification indicating disagreement with the planned route of the self-driving vehicle B.

Note that, the response received by the response receiving unit 9 from the self-driving vehicle B is a response which is obtained such that a determination unit 31*b* of the self-driving vehicle B determined whether to agree with the planned route of the self-driving vehicle A and a response transmission unit 33*b* of the self-driving vehicle B transmitted to the self-driving vehicle A according to the determination result.

The aspect of the inter-vehicle communication which the transmission unit 6, the response receiving unit 9, the receiving unit 32, and the response transmission unit 33 perform is not specifically limited. For example, the transmission unit 6, the response receiving unit 9, the receiving unit 32, and the response transmission unit 33 may use radio waves or may use infrared rays in the inter-vehicle communication. This point is the same as in the second exemplary embodiment described later.

The target setting unit 7, the planned route creating unit 3, the transmission unit 6 (excluding hardware for communication), the response receiving unit 9 (excluding hardware for communication), the traveling control unit 8, the determination unit 31, the receiving unit 32 (excluding hardware for communication), and the response transmission unit 33 (excluding hardware for communication) are realized by, for example, a computer that operates according to a vehicle control program. This computer is provided in a self-driving vehicle. In this case, the computer reads the vehicle control program from a program storage medium such as a program storage device included in the computer, and may operate as the target setting unit 7, the planned route creating unit 3, the transmission unit 6, the response receiving unit 9, the traveling control unit 8, the determination unit 31, the receiving unit 32, and the response transmission unit 33 according to the vehicle control program. Note that hardware for communication (communication interface) is connected to the computer.

Figure 4:
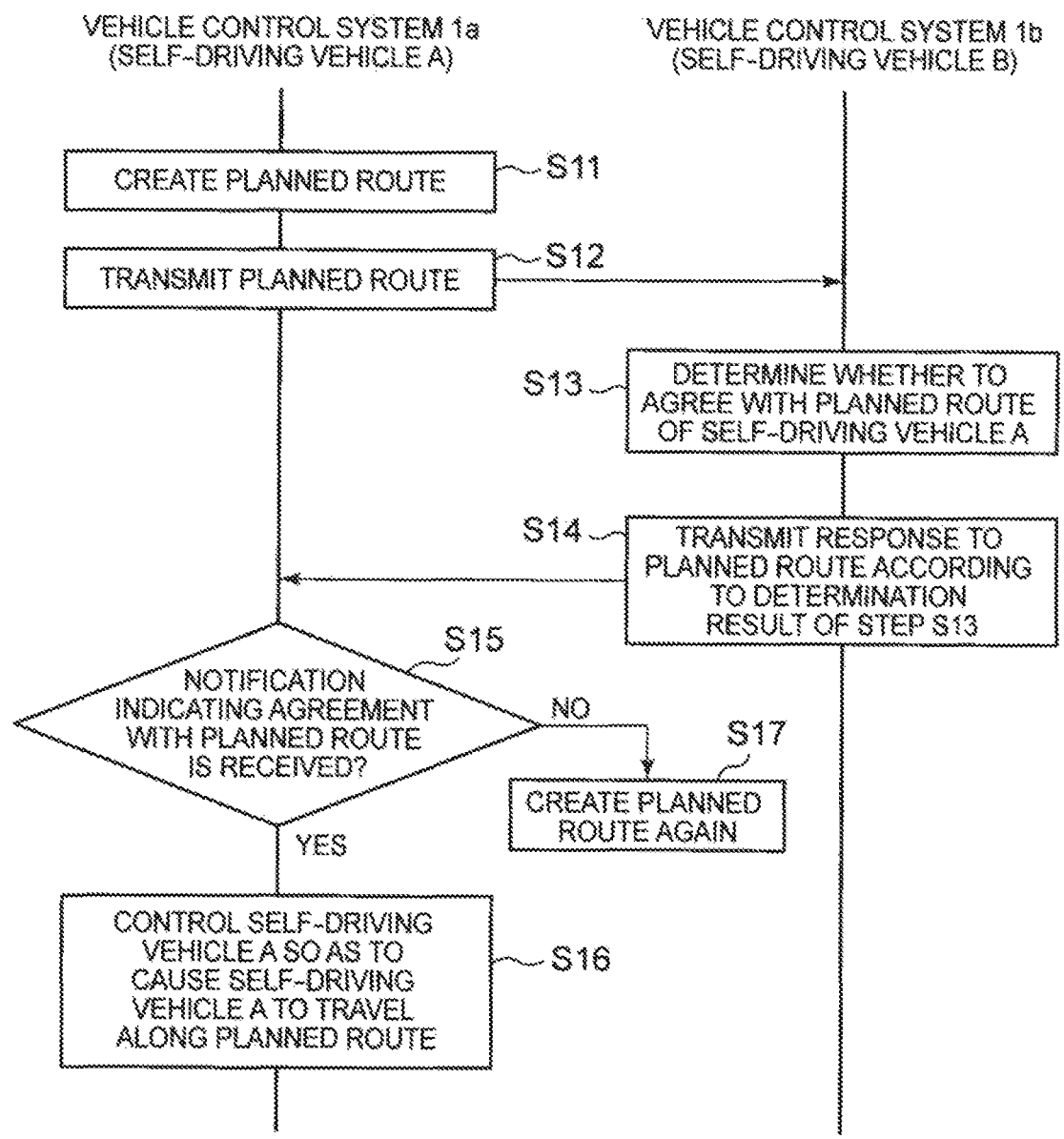
FIG. 4 It depicts a sequence diagram showing an example of a processing progress of the first exemplary embodiment.

Next, the processing progress will be described. FIG. 4 is a sequence diagram showing an example of the processing progress of the first exemplary embodiment. In addition, since the operation of each element of the vehicle control system 1 is already described, the detailed description of the operation is omitted here. In the following description, the case where the self-driving vehicle A (vehicle control system 1*a*) transmits the planned route of the self-driving vehicle A to the self-driving vehicle B (vehicle control system 1*b*) will be described as an example. The processing progress in the case where the self-driving vehicle B transmits the planned route of the self-driving vehicle B to the self-driving vehicle A is the same.

It is assumed that a target setting unit 7a of the vehicle control system 1a has already set a mission.

A planned route creating unit 3a creates a planned route of the self-driving vehicle A in accordance with the mission already set (step S11). In other words, the planned route creating unit 3a creates the planned route of the self-driving vehicle A so as to achieve the mission.

A transmission unit 6a broadcasts the planned route and the identification information of the self-driving vehicle A to another self-driving vehicle existing in the vicinity (step S12).

A receiving unit 32b of the vehicle control system 1b receives the planned route of the self-driving vehicle A and the identification information of the self-driving vehicle A transmitted in step S12. In addition, it is assumed that a planned route creating unit 3b of the vehicle control system 1b creates a planned route of the self-driving vehicle B.

The determination unit 31b of the vehicle control system 1b determines whether to agree with the planned route of the self-driving vehicle A on the basis of the planned route of the other self-driving vehicle A received by the receiving unit 32b and the planned route of the self-driving vehicle B created by the planned route creating unit 3b (step S13). For example, if the planned route of the self-driving vehicle A and the planned route of the self-driving vehicle B do not intersect, the determination unit 31b determines to agree with the planned route of the self-driving vehicle A. If the planned route of the self-driving vehicle A intersects with the planned route of the self-driving vehicle B, the determination unit 31b determines not to agree with the planned route of the self-driving vehicle A.

Next, the response transmission unit 33b transmits a response to the planned route received by the receiving unit 32b to a self-running vehicle A by the unicast method according to the determination result of step S13 (step S14). When the determination unit 31b has determined to agree with the planned route of the self-driving vehicle A, the response transmission unit 33b transmits, to the self-driving vehicle A, a notification indicating agreement with the planned route of the self-driving vehicle A. In addition, when the determination unit 31b has determined not to agree with the planned route of the self-driving vehicle A, the response transmission unit 33b transmits, to the self-driving vehicle A, a notification indicating disagreement with the planned route of the self-driving vehicle A.

A response receiving unit 9a of the vehicle control system 1a receives the response transmitted in step S14. Here, when the response receiving unit 9a has received a notification indicating agreement with the planned route of the self-driving vehicle A (Yes in step S15), a traveling control unit 8a controls the self-driving vehicle A so as to cause the self-driving vehicle A to travel along the planned route of the self-driving vehicle A that the vehicle control system 1b has agreed with (step S16). In addition, in a case where another self-driving vehicle B has agreed with the planned route of the self-driving vehicle A, then, when the planned route creating unit 3a creates the planned route of the self-driving vehicle A, the planned route creating unit 3a is limited by the planned route that the other self-driving vehicle B has agreed with. That is, the planned route creating unit 3a creates a planned route that does not deviate from the agreed planned route. In addition, the traveling control unit 8a causes the self-driving vehicle A to travel so as not to deviate from the agreed planned route. Therefore, when the planned route of the self-driving vehicle A is agreed with by another self-driving vehicle B, the movement of the self-driving vehicle A is limited by the planned route.

Further, when the response receiving unit 9a has received a notification indicating disagreement with the planned route of the self-driving vehicle A (No in step S15), the planned route creating unit 3a creates the planned route of the self-driving vehicle A again (step S17). Thereafter, the operations of step S12 and subsequent steps may be performed.

The effects of the present exemplary embodiment will be described by comparison with PTLs 1 and 2. In comparison with the techniques described in the cited literatures 1 and 2, the techniques described in the cited literatures 1 and 2 communicate information corresponding to a mission (for example, a request for changing lanes, etc.) between vehicles and determine whether to give permission for the mission. Therefore, with the techniques described in the cited literatures 1 and 2, it may not be possible to say that a smooth traffic flow can be realized.

On the other hand, according to the present exemplary embodiment, the vehicle control system 1 transmits not the mission itself but the planned route created by the planned route creating unit 3 according to the mission to another self-driving vehicle by inter-vehicle communication. Then, when the notification indicating agreement with the planned route is received from the self-driving vehicle, the vehicle control system 1 causes the self-driving vehicle including the vehicle control system 1 to travel along the planned route. That is, the vehicle control system 1 receives an agreement of another self-driving vehicle on not the mission itself but the result of motion planning according to the mission, and causes the host vehicle to travel according to the result of the motion planning. For example, the planned route includes information indicating the correspondence between the time of day and the position of the host vehicle. In this way, the planned route is more detailed information than the mission, and the vehicle control system 1 receives agreement of another self-driving vehicle on such a planned route and causes the host vehicle to travel along the planned route. Therefore, a smooth traffic flow can be realized.

In the first exemplary embodiment, the planned route creating unit 3 may create a planned route having a width instead of the planned route represented as a line schematically shown in FIG. 3.

Second Exemplary Embodiment

In the first exemplary embodiment, the vehicle control system transmits the planned route of the host vehicle to another self-driving vehicle. However, it is more preferable to notify another self-driving vehicle of the non-traveling area plan (hereinafter simply referred to as non-traveling area plan) than to notify another self-driving vehicle of the planned route. This is due to the following reasons.

When the self-driving vehicle B is notified of the non-traveling area plan of another self-driving vehicle A, the self-driving vehicle B can perform mission planning or motion planning so that the self-driving vehicle B travels in the non-traveling area. Since the non-traveling area is an area where it is determined that the self-driving vehicle A does not travel, the self-driving vehicle B can set a mission or a planned route that is not affected by the self-driving vehicle A. In this respect, it may be more preferable to notify another self-driving vehicle of the non-traveling area plan than the planned route. In addition, when the self-driving vehicle B is notified of a planned route of another self-driving vehicle A, it is also conceivable that the self-driving vehicle B estimates an area other than the planned route as an area where the self-driving vehicle A does not travel, and performs mission planning or motion planning. However, the area is merely an area estimated by the self-driving vehicle B. It is more preferable to be notified of the non-traveling area plan itself which is the area where the intention of the self-driving vehicle A is clearly stated (in other words, declared) that "there is no plan to travel in this area".

Further, it is assumed that the vehicle control system of the self-driving vehicle A receives an agreement of another self-driving vehicle B on the planned route of the self-driving vehicle A and performs control so as to cause the self-driving vehicle A to travel along the planned route. Then, in that state, suppose that some kind of accident has occurred. Even if the vehicle control system controls the self-driving vehicle A so as to cause the self-driving vehicle A to travel along the planned route, the route actually traveled and the planned route actually do not coincide due to the influence of the road surface condition, cross wind, etc. In this case, a discussion occurs as to whether it can be said that an accident has occurred because the self-driving vehicle A has traveled a route that does not match the planned route. On the other hand, when the self-driving vehicle A has notified the other self-driving vehicle B of the non-traveling area plan of the self-driving vehicle A, it is easily determined whether the self-driving vehicle A has entered the non-traveling area. The above discussion does not occur. Even in view of this point, it may be preferable to notify another self-driving vehicle of the non-traveling area plan rather than the planned route.

In addition, when the self-driving vehicle A notifies the other self-driving vehicle B of the planned route of the self-driving vehicle A, and the self-driving vehicle B has agreed with the planned route, the movement of the self-driving vehicle A is limited by the planned route. That is, the self-driving vehicle A is obliged to travel according to the planned route. In this case, the self-driving vehicle A cannot cope with any situation where it cannot travel along the planned route. Even in view of this point, it may be preferable to notify another self-driving vehicle of the non-traveling area plan rather than the planned route.

A vehicle control system of the second exemplary embodiment creates a non-traveling area plan and notifies another self-driving vehicle of the non-traveling area plan.

Figure 5:
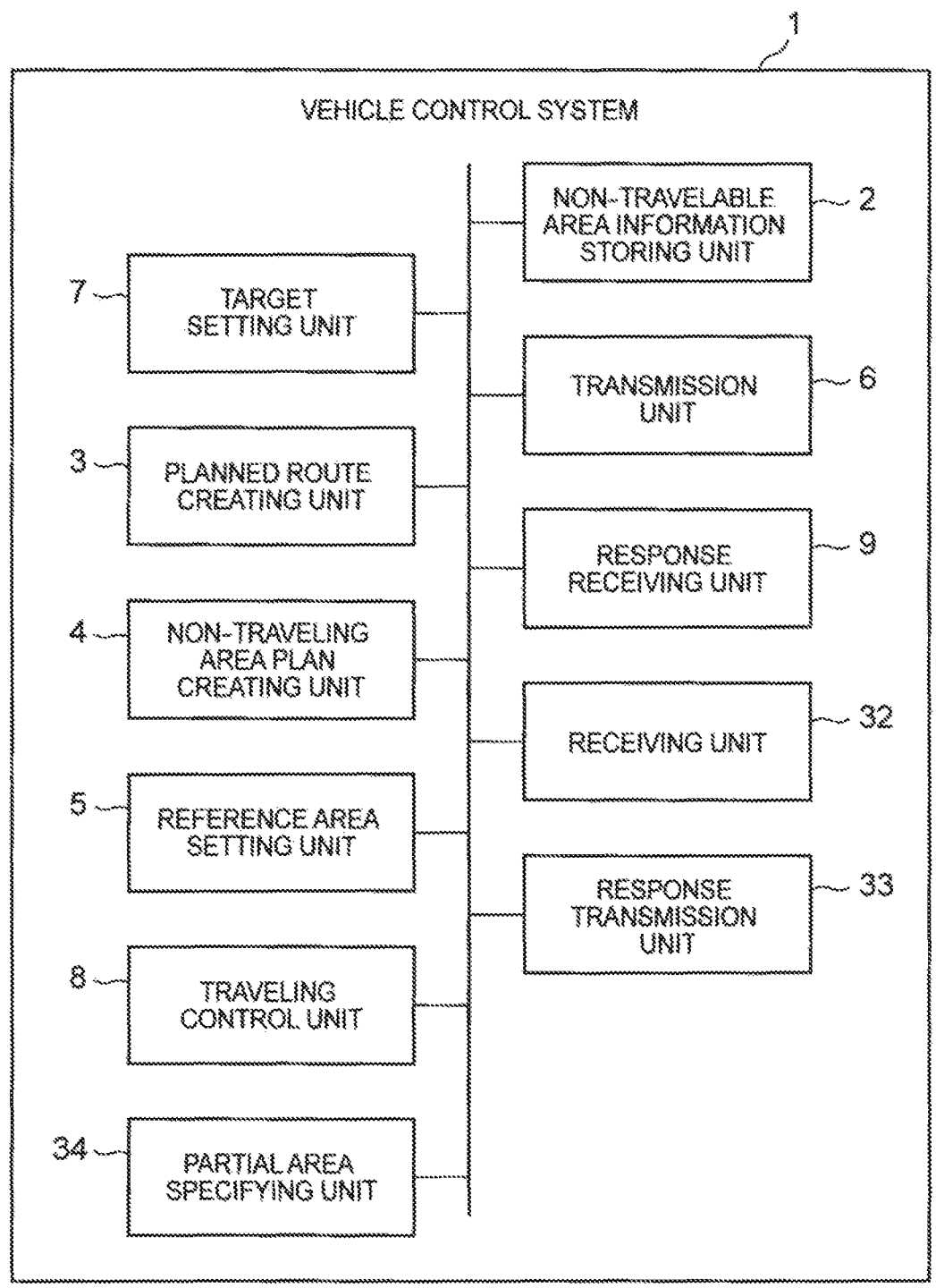
FIG. 5 It depicts a block diagram showing an example of a vehicle control system according to a second exemplary embodiment of the present invention.

FIG. 5 is a block diagram showing an example of the vehicle control system according to the second exemplary embodiment of the present invention. About the element same as the element shown in the first exemplary embodiment, the code same as the code shown in FIG. 1 is attached, and detailed description is omitted. The vehicle control system 1 according to the second exemplary embodiment includes a non-travelable area information storing unit 2, a target setting unit 7, a planned route creating unit 3, a non-traveling area plan creating unit 4, a reference area setting unit 5, a transmission unit 6, a response receiving unit 9, a traveling control unit 8, a partial area specifying unit 34, a receiving unit 32, and a response transmission unit 33. In the following description, for convenience, description will be provided assuming that a self-driving vehicle equipped with the vehicle control system 1 is the self-driving vehicle A.

The non-travelable area information storing unit 2, the target setting unit 7, and the planned route creating unit 3 are the same as the non-travelable area information storing unit 2, the target setting unit 7, and the planned route creating unit 3 in the first exemplary embodiment, respectively and the description thereof will be omitted.

The traveling control unit 8 controls the self-driving vehicle A so as to cause the self-driving vehicle A to travel along the planned route created by the planned route creating unit 3. However, in the present exemplary embodiment, the vehicle control system 1 does not receive a determination as to whether another self-driving vehicle agrees with the planned route. Accordingly, the traveling control unit 8 controls the self-driving vehicle A on the basis of the planned route without requiring the agreement of another self-driving vehicle on the planned route.

The non-traveling area plan creating unit 4 creates a plan of the non-traveling area of the self-driving vehicle A on the basis of the planned route created by the planned route creating unit 3. As already described above, the non-traveling area is an area where the self-driving vehicle can travel and is an area set as an area where the self-driving vehicle does not travel.

The non-traveling area plan creating unit 4 creates a non-traveling area plan associated with the time. More specifically, the non-traveling area plan creating unit 4 creates a non-traveling area plan for each time zone.

Hereinafter, an example of the creation operation of the non-traveling area plan will be described. First, a first example of the creation operation of the non-traveling area plan will be described. In the first example, the non-traveling area plan creating unit 4 sets, as a non-traveling area, an area which is an area other than the area within Xm on both sides of the planned route and which does not overlap the non-travelable area 11, for each time zone. This means that the self-driving vehicle A (more specifically, the non-traveling area plan creating unit 4) determines not to travel in an area other than the area within Xm on both sides of the planned route. Here, the case where the planned route 15 shown in FIG. 3 is created will be described as an example.

Figure 6:
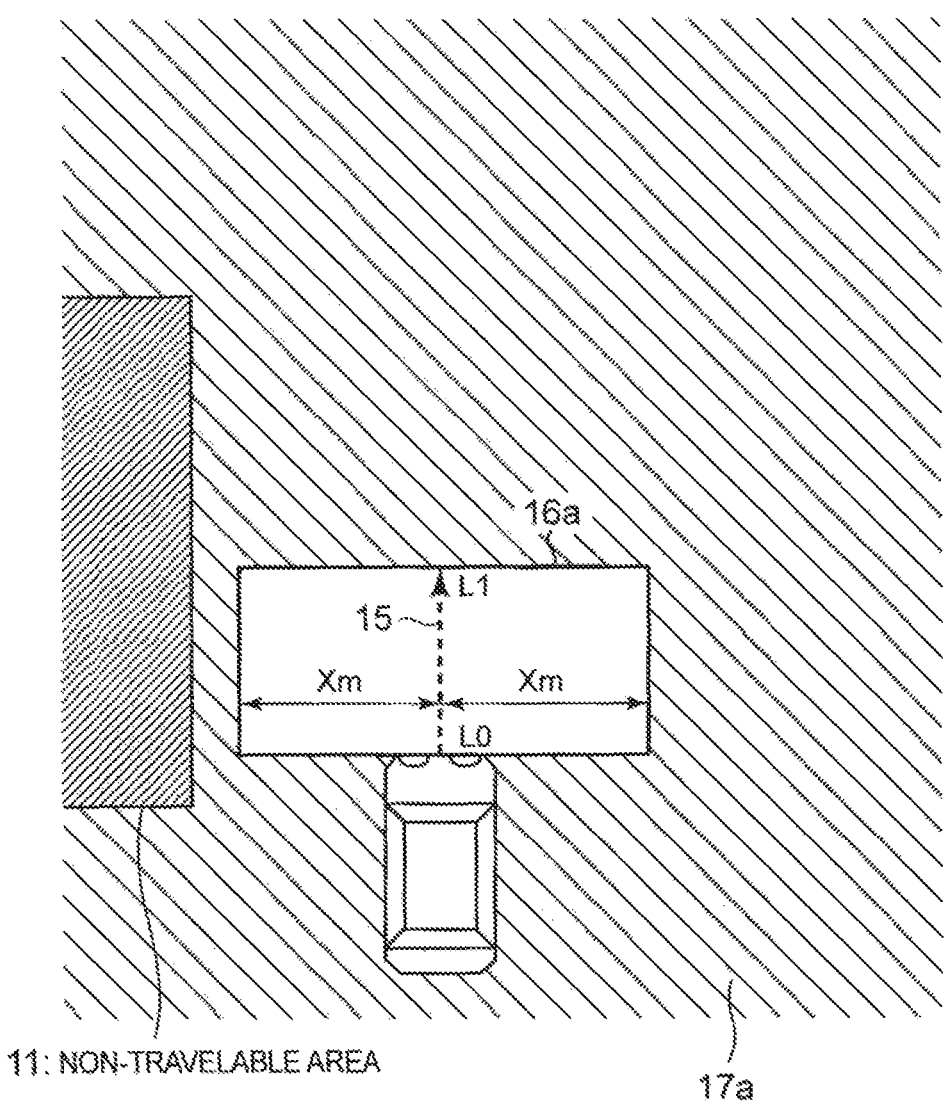
FIG. 6 It depicts a schematic diagram showing a non-traveling area of a self-driving vehicle A in a time zone t0 to t1.

FIG. 6 is a schematic diagram showing the non-traveling area of the self-driving vehicle A in the time zone t0 to t1. In FIG. 6, the planned route 15 in the time zone t0 to t1 is indicated by a broken line. An area 16a shown in FIG. 6 is an area within Xm on both sides of this planned route. Then, the non-traveling area plan creating unit 4 sets an area 17a which is an area other than the area 16a and does not overlap the non-travelable area 11, as a non-traveling area in the time zone t0 to t1.

Although the non-travelable area may exist other than the non-travelable area 11 shown in FIG. 6, only the non-travelable area 11 is shown as the non-travelable area here in order to simplify the description. This point is the same in the other drawings such as FIG. 7.

Figure 7:
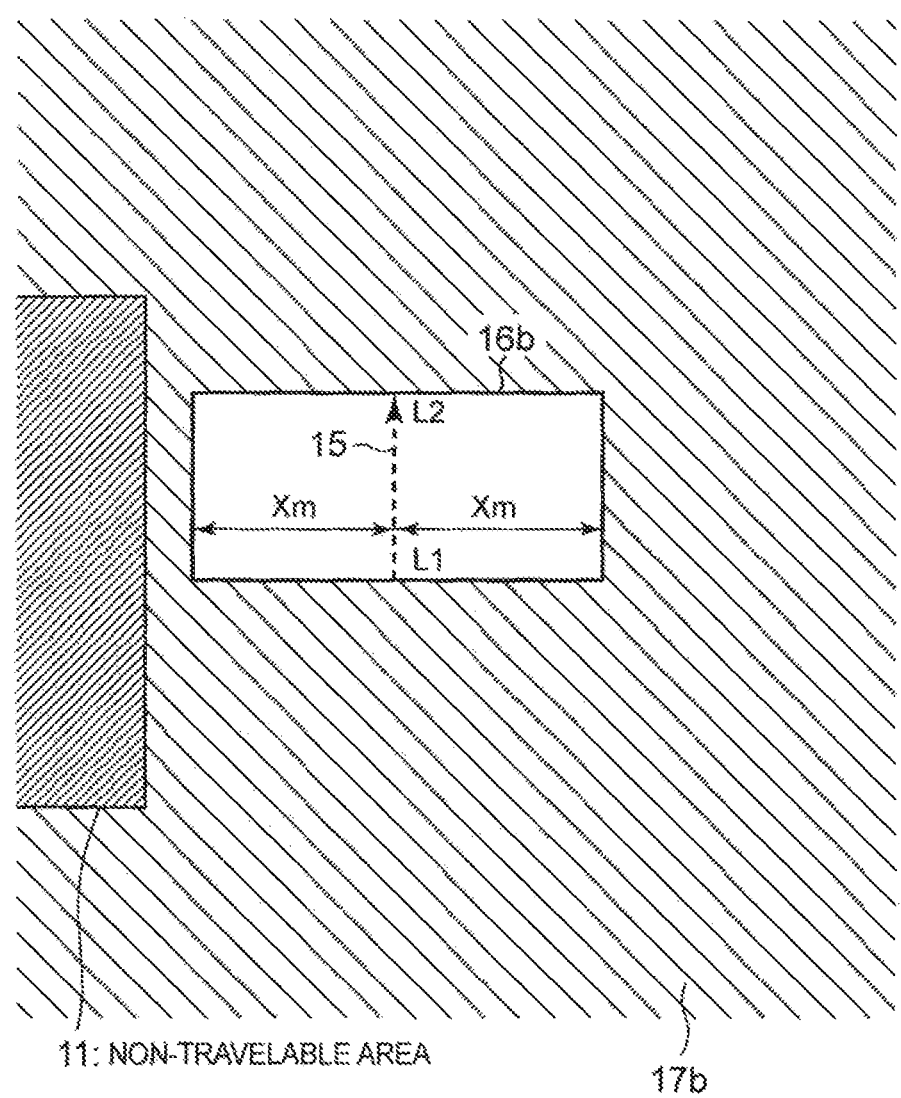
FIG. 7 It depicts a schematic diagram showing a non-traveling area of the self-driving vehicle A in a time zone t1 to t2.

FIG. 7 is a schematic diagram showing the non-traveling area of the self-driving vehicle A in the time zone t1 to t2. In FIG. 7, the planned route in the time zone t1 to t2 is indicated by a broken line. An area 16b shown in FIG. 7 is an area within Xm on both sides of this planned route. Then, the non-traveling area plan creating unit 4 sets an area 17b which is an area other than the area 16b and does not overlap the non-travelable area 11, as the non-traveling area in the time zone t1 to t2.

The non-traveling area plan creating unit 4 similarly sets the non-traveling area of the self-driving vehicle A also for each time zone after time t2. The length of the time zone (for example, t0 to t1, etc.) when setting the non-traveling area may be set in advance.

The non-traveling area set for each time zone is the non-traveling area plan. The above is the first example of the creation operation of the non-traveling area plan.

Figure 8:
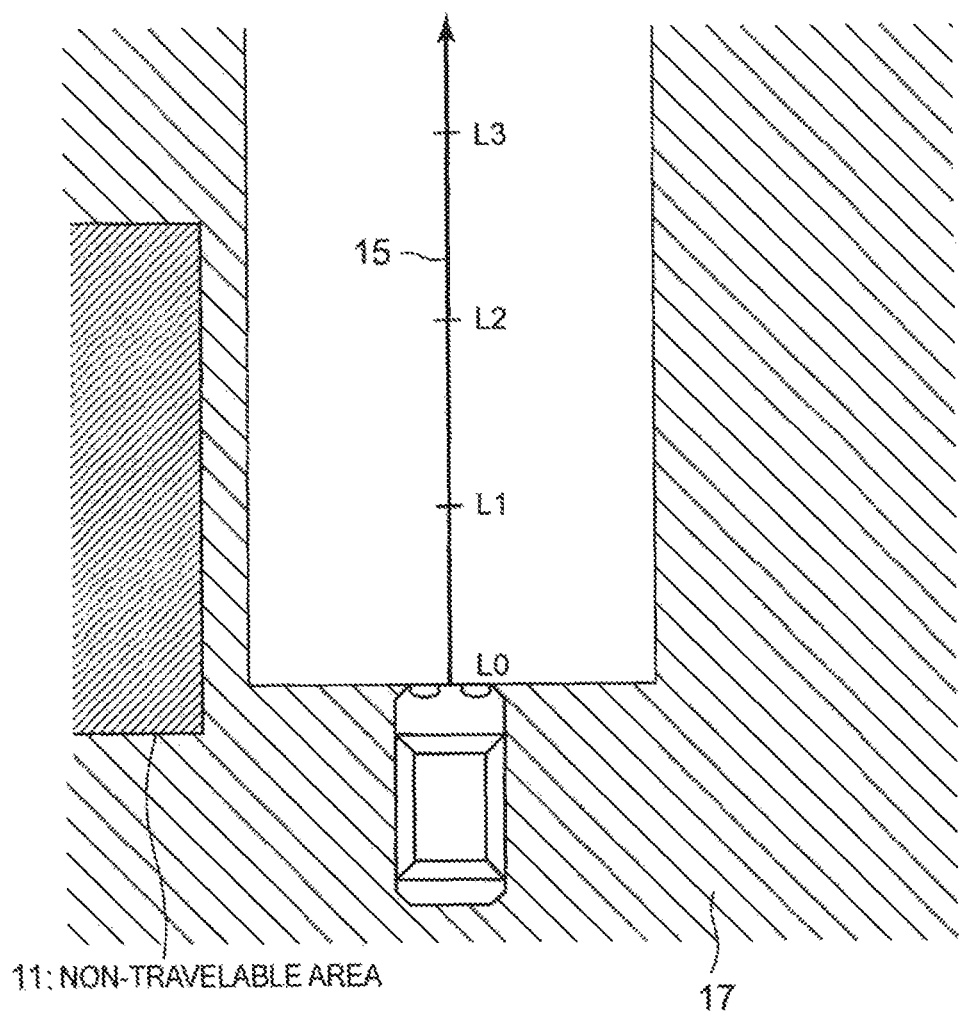
FIG. 8 It depicts a schematic diagram showing an example of a product set of non-traveling areas set for each time zone.

The product set of non-traveling areas set for each time zone as described above can be said to be an area which is an area within the travelable area and is set as an area where the self-driving vehicle does not travel at any time. FIG. 8 shows an example of a product set of non-traveling areas set for each time zone. The area 17 shown in FIG. 8 corresponds to this product set.

Next, a second example of a creation operation of the non-traveling area plan will be described. In this case, the planned route creating unit 3 obtains (derives) a plurality of planned routes by one or more algorithms in the process of finally setting one planned route. In this case, the planned route creating unit 3 sets an optimal planned route (for example, a planned route with the shortest route) from among the plurality of planned routes, as a final planned route.

In the second example, a non-traveling area plan is created based on a plurality of planned routes obtained by the planned route creating unit 3 in the process of setting the final planned route.

Figure 9:
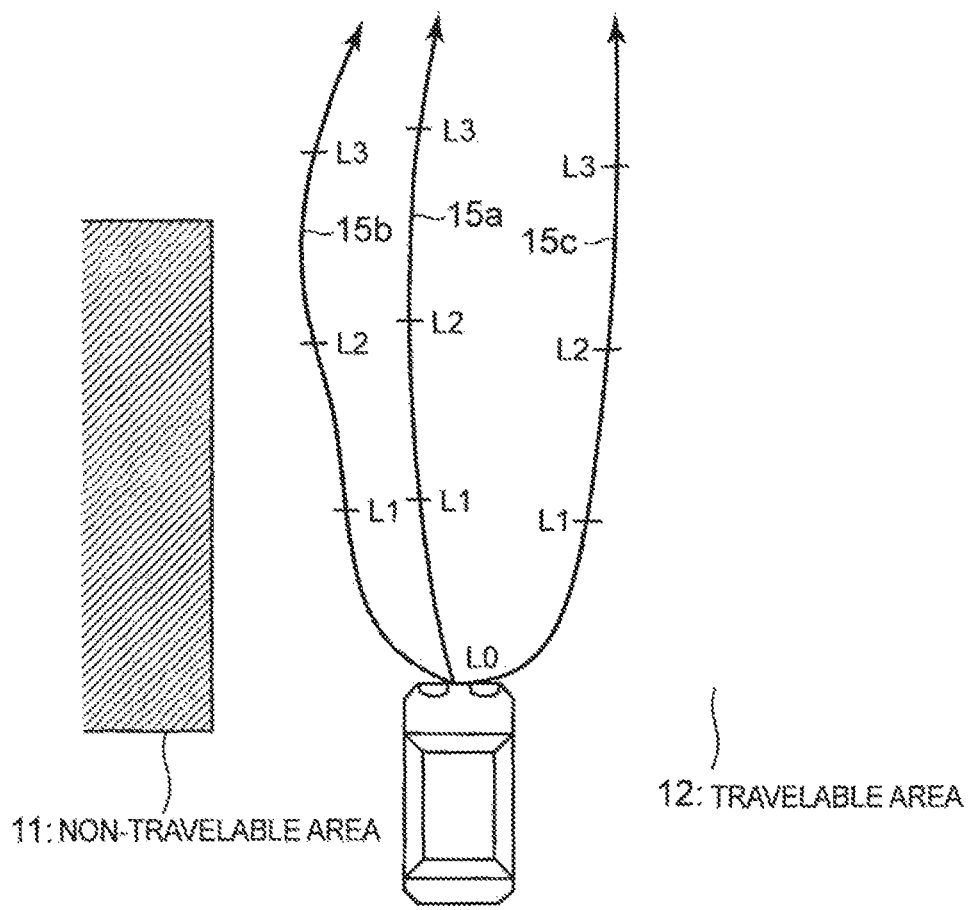
FIG. 9 It depicts an explanatory diagram showing an example of a plurality of planned routes.

FIG. 9 is an explanatory diagram showing an example of a plurality of planned routes. Although FIG. 9 illustrates three planned routes 15a to 15c, the number of planned routes is not limited to three. The planned route creating unit 3 creates each of the planned routes 15a to 15c in the travelable area 12. As in the previous case, t0 is the current time. t1, t2, and t3 are future times. In the example shown in FIG. 9, L0 is the position of the self-driving vehicle A at the current time t0. L1 is the position of the self-driving vehicle A at time t1. L2 is the position of the self-driving vehicle A at time t2. L3 is the position of the self-driving vehicle A at time t3.

Also in the second example, the non-traveling area plan creating unit 4 sets the non-traveling area for each time zone. The non-traveling area plan creating unit 4, when setting the non-traveling area of one time zone, specifies an area surrounded by outermost planned routes in that time zone, a line obtained by connecting the positions on the respective planned routes at the start time of that time zone, and a line obtained by connecting positions on the respective planned routes at the end time of the time zone. Then, the non-traveling area plan creating unit 4 sets an area which is an area other than that area and does not overlap the non-travelable area, as the non-traveling area. This means that it is determined that the self-driving vehicle A (more specifically, the non-traveling area plan creating unit 4) does not travel in an area other than that area. In order to simplify the description, FIG. 9 shows the case where the outermost planned routes are the planned route 15b and the planned route 15c without change in any time zone. By crossing of the planned routes, the outermost planned route may be replaced.

Figure 10:
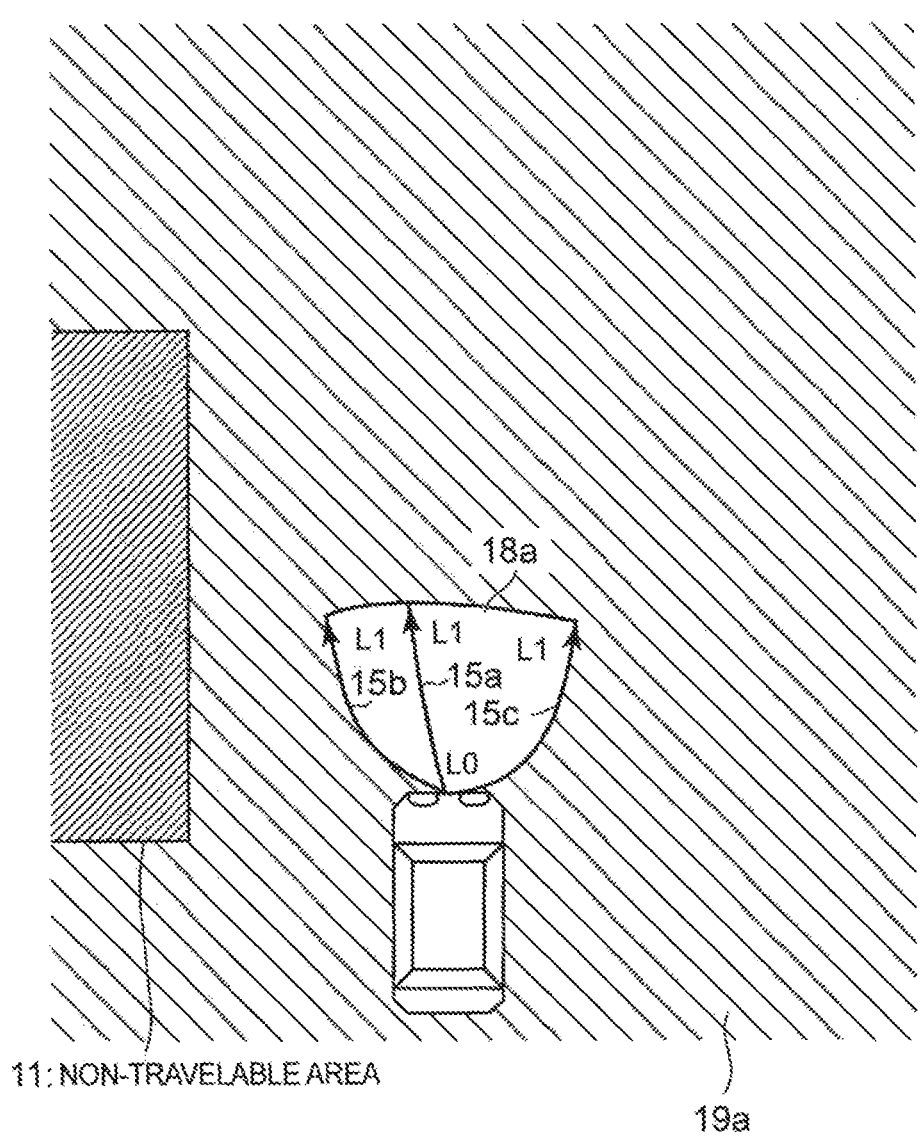
FIG. 10 It depicts a schematic diagram showing a non-traveling area of the self-driving vehicle A in the time zone t0 to t1.

FIG. 10 is a schematic diagram showing the non-traveling area of the self-driving vehicle A in the time zone t0 to t1. The planned routes that are outermost in this time zone are the planned route 15b and the planned route 15c. Also, the positions on the respective planned routes at time t0 are common. Further, a line obtained by connecting positions on the respective planned routes at time t1 is as shown in FIG. 10. Therefore, an area surrounded by the planned route 15b, the planned route 15c, the line obtained by connecting the positions on the respective planned routes at time t0 (this line is a point in this example), and the line obtained by connecting the positions on the respective planned routes at time t1 is an area 18a shown in FIG. 10. Then, the non-traveling area plan creating unit 4 sets an area 19a which is an area other than the area 18a and does not overlap the non-travelable area 11, as a non-traveling area in the time zone t0 to t1.

Figure 11:
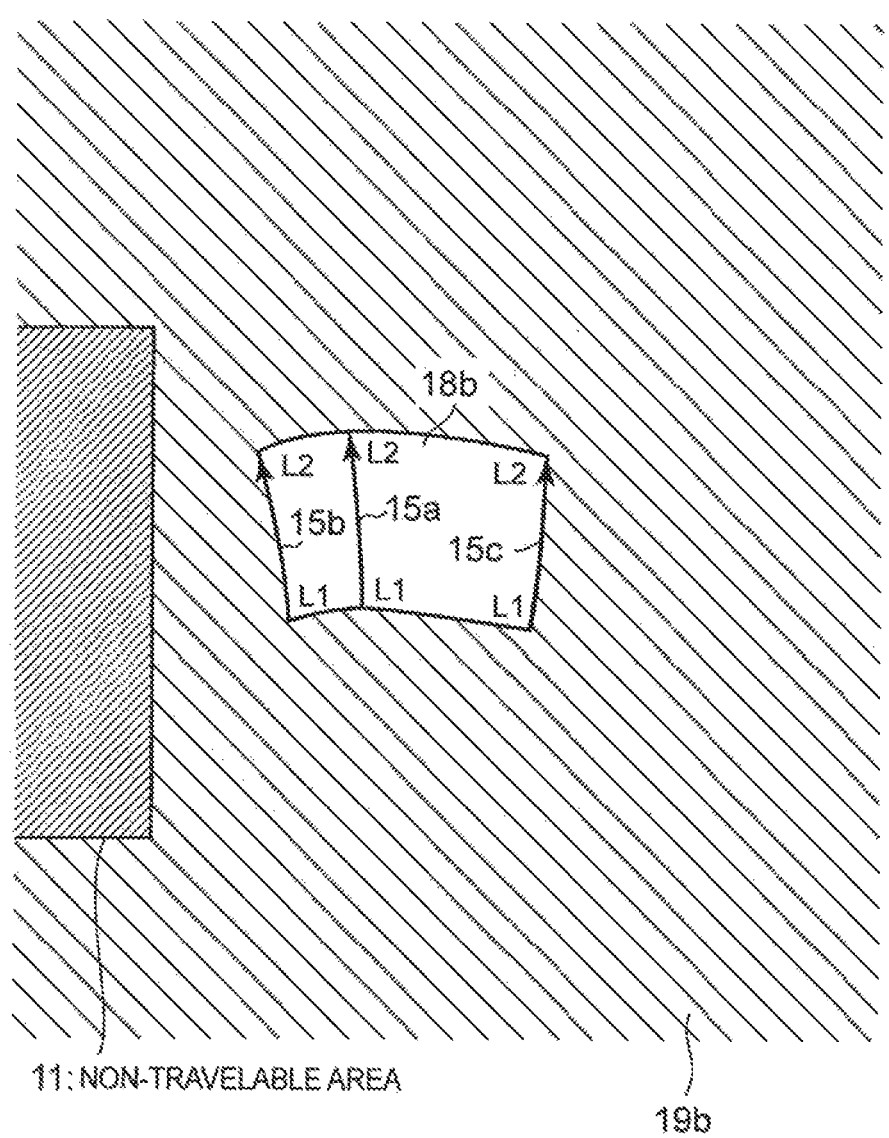
FIG. 11 It depicts a schematic diagram showing a non-traveling area of the self-driving vehicle A in the time zone t1 to t2.

FIG. 11 is a schematic diagram showing a non-traveling area of the self-driving vehicle A in the time zone t1 to t2. The planned routes that are outermost in this time zone are the planned route 15b and the planned route 15c. Further, a line obtained by connecting the positions on the respective planned routes at time t1 and a line obtained by connecting the positions on the respective planned routes at time t2 are as shown in FIG. 11. Therefore, an area surrounded by the planned route 15b, the planned route 15c, the line obtained by connecting the positions on the respective planned routes at time t1, and the line obtained by connecting the positions on the respective planned routes at time t2 is an area 18b shown in FIG. 11. Then, the non-traveling area plan creating unit 4 sets an area 19b which is an area other than the area 18b and does not overlap the non-travelable area 11, as the non-traveling area in the time zone t1 to t2.

The non-traveling area plan creating unit 4 similarly sets the non-traveling area of the self-driving vehicle A also for each time zone after time t2. As already described above, the length of the time zone (for example, t0 to t1, etc.) when setting the non-traveling area may be set in advance.

The non-traveling area set for each time zone is the non-traveling area plan. The above is the second example of the creation operation of the non-traveling area plan.

Figure 12:
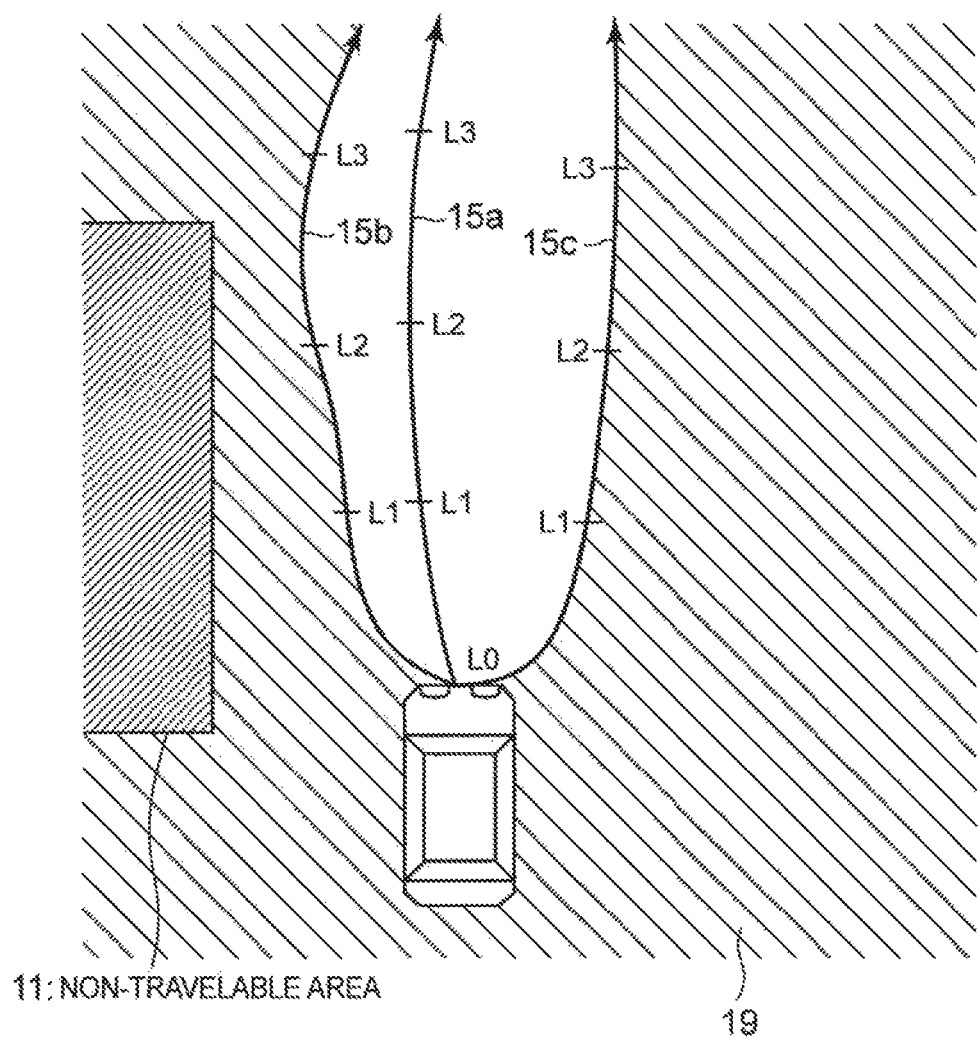
FIG. 12 It depicts a schematic diagram showing an example of a product set of non-traveling areas set for each time zone.

The product set of non-traveling areas set for each time zone as described above can be said to be an area which is an area within the travelable area and is set as an area where the self-driving vehicle does not travel at any time. FIG. 12 shows an example of a product set of non-traveling areas set for each time zone. The area 19 shown in FIG. 12 corresponds to this product set.

It can be said that an area other than the area 19 (an area not indicated by hatching in FIG. 12) in the travelable area 12 is an area which may include a planned route created at a time later than the current time under the same mission. Let m be the current mission. Under mission m, the set of planned routes that can be created at time t is denoted as $P_t(m)$. Also, let the current time be t0. It can be said that the area other than the area 19 in the travelable area 12 includes an area represented as follows.

$$\bigcup_{t \geq t0} P_t(m) \qquad \text{[Math. 1]}$$

In the example shown in FIG. 8, the same applies to an area other than the area 17 (an area not hatched in FIG. 8) in the travelable area 12.

The first example and the second example have been described as examples of the creation operation of the non-traveling area plan. The creation operation of the non-traveling area plan is not limited to the above two examples, and the non-traveling area plan creating unit 4 may create the non-traveling area plan by another method.

Figure 13:
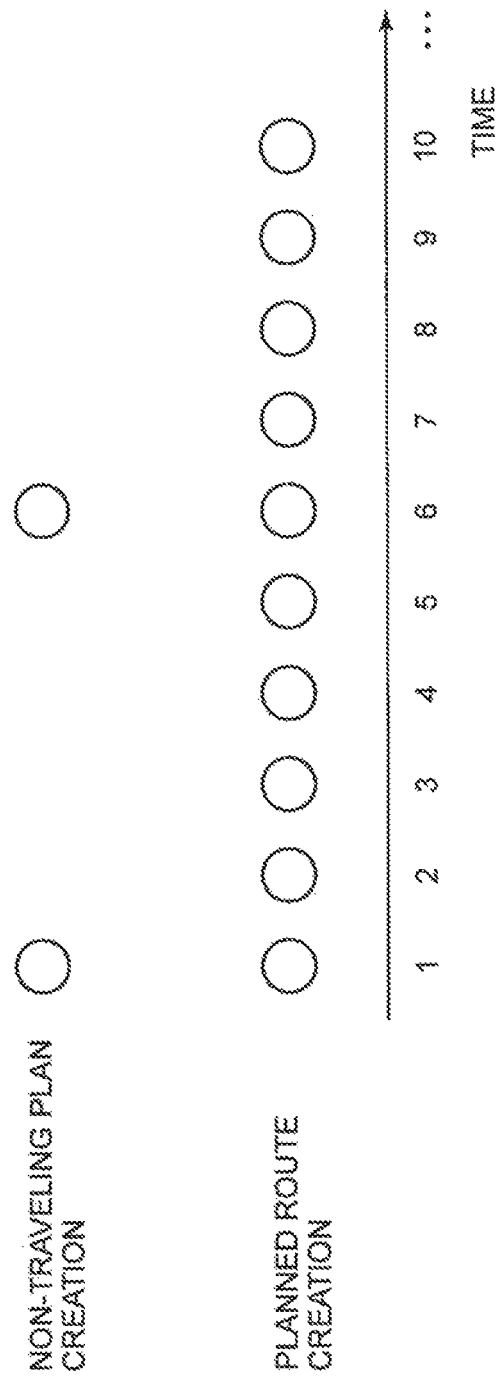
FIG. 13 It depicts a schematic diagram showing a creation frequency of a non-traveling area plan and a creation frequency of a planned route.

The non-traveling area plan creating unit 4 creates a non-traveling area plan at a frequency lower than the frequency at which the planned route creating unit 3 creates a planned route. For example, the planned route creating unit 3 creates a planned route at 25 Hz. In addition, the non-traveling area plan creating unit 4 creates a non-traveling area plan, for example, at 5 Hz. However, the value such as 5 Hz shown here is an example, and it is sufficient if the creation frequency of the non-traveling area plan is lower than the creation frequency of the planned route. FIG. 13 is a schematic diagram showing the creation frequency of the non-traveling area plan and the creation frequency of the planned route. The horizontal axis shown in FIG. 13 represents time. In addition, circular markers shown in FIG. 13 indicate the timing of creating a planned route and the timing of creating a non-traveling area plan. In the present invention, as shown in FIG. 13, the frequency at which the non-traveling area plan creating unit 4 creates the non-traveling area plan is lower than the frequency at which the planned route creating unit 3 creates the planned route.

In the following description, the planned route creating unit 3 creates a planned route at 25 Hz, and the non-traveling area plan creating unit 4 creates a non-traveling area plan at 5 Hz as an example.

The reference area setting unit 5 sets an area which is an area having a width including the planned route created by the planned route creating unit 3 and serves as a determination reference of whether the non-traveling area plan creating unit 4 creates a non-traveling area plan again without depending on the set frequency (in this example, frequency of 5 Hz). Hereinafter, this area is referred to as a reference area. The reference area setting unit 5 sets a reference area when the non-traveling area plan is created.

Figure 14:
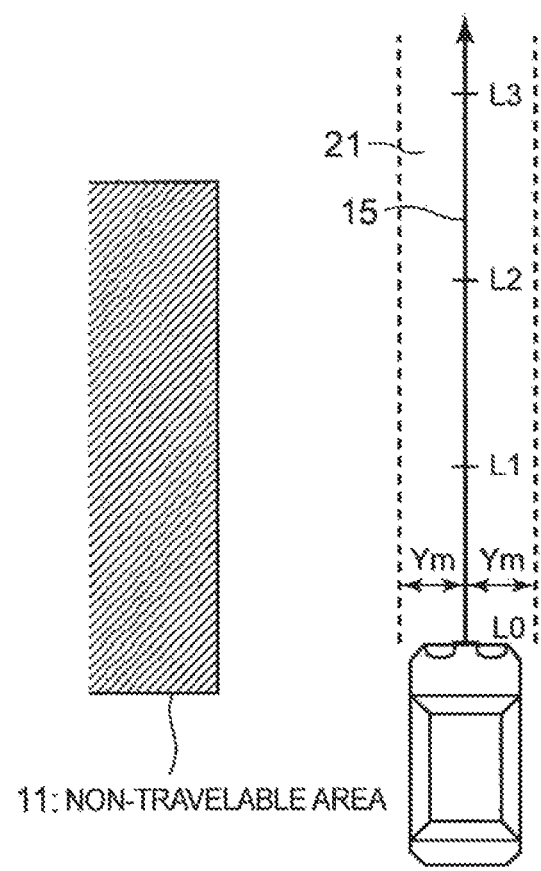
FIG. 14 It depicts a schematic diagram showing an example of a reference area.

When the non-traveling area plan creating unit 4 creates a non-traveling area plan by the method shown in the first example described above, the reference area setting unit 5 sets, as a reference area, an area within Ym on both sides of the planned route (for example, the planned route 15 shown in FIG. 3) used by the non-traveling area plan creating unit 4 for generating the non-traveling area plan. However, Ym is a value smaller than the above-mentioned Xm (refer to FIG. 6 and FIG. 7). FIG. 14 is a schematic diagram showing an example of the reference area. In the example shown in FIG. 14, an area centered on the planned route 15, which is sandwiched by two broken lines, corresponds to a reference area 21.

Figure 15:
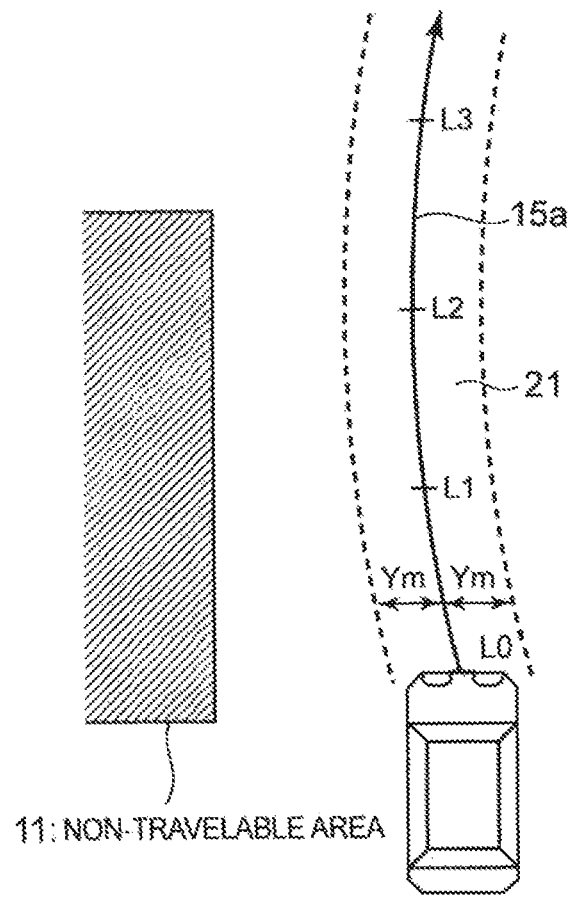
FIG. 15 It depicts a schematic diagram showing another example of the reference area.

Further, when the non-traveling area plan creating unit 4 creates a non-traveling area plan by the method shown in the above-described second example, the planned route creating unit 3 derives a plurality of planned routes in the process of finally setting one planned route and sets, as a final planned route, an optimal planned route from among the plurality of planned routes. The reference area setting unit 5 sets an area within Ym on both sides of the planned route, as a reference area. FIG. 15 is a schematic diagram showing another example of the reference area. It is assumed that the planned route creating unit 3 sets the planned route 15a shown in FIG. 9 as the optimal planned route. In this case, the reference area setting unit 5 sets an area within Ym on both sides of the planned route 15a as the reference area 21. In the example shown in FIG. 15, an area centered on the planned route 15a, which is sandwiched by two broken lines, corresponds to the reference area 21.

When the planned route newly created by the planned route creating unit 3 deviates from the reference area 21, the non-traveling area plan creating unit 4 creates the non-traveling area plan again regardless of the set frequency (frequency of 5 Hz in this example). That is, when the new planned route deviates from the reference area 21, the non-traveling area plan creating unit 4 newly creates the non-traveling area plan even if it is not the set timing. For example, in the example shown in FIG. 13, the non-traveling area plan creating unit 4 creates the non-traveling area plan at times "1" and "6". Then, for example, when the planned route created at time "3" deviates from the reference area 21 set at time "1", the non-traveling area plan creating unit 4 newly creates the non-traveling area plan at that timing. In addition, since the non-traveling area plan is newly created, the reference area setting unit 5 newly sets a reference area.

The transmission unit 6 broadcasts the non-traveling area plan to the self-driving vehicles existing in the vicinity every time the non-traveling area plan creating unit 4 creates the non-traveling area plan. At this time, the transmission unit 6 broadcasts also the identification information of the self-driving vehicle A together with the non-traveling area plan. This is to allow other self-driving vehicles that have received the non-traveling area plan to respond to the self-driving vehicle A. Here, the self-driving vehicle B will be described as an example of another self-driving vehicle existing in the vicinity.

In addition, the transmission unit 6 should just transmit the non-traveling area plan and the identification information of the self-driving vehicle A and does not transmit the planned route.

As a response to the transmitted non-traveling area plan, the response receiving unit 9 receives, from another self-driving vehicle B, information on a partial area which is an area within the non-traveling area and which the self-driving vehicle B has agreed with as a non-traveling area of the self-driving vehicle A. Here, the partial area is a subset of the non-traveling area.

When the self-driving vehicle A notifies the self-driving vehicle B of the non-traveling area of the self-driving vehicle A and obtains the agreement of the self-driving vehicle B on the partial area, the self-driving vehicle A has a limitation (obligation) not to travel in the agreed partial area. Therefore, after the response receiving portion 9 receives the information on the partial area agreed with by the self-driving vehicle B as the non-traveling area of the self-driving vehicle A, when the planned route creating unit 3 creates the planned route of the self-driving vehicle A, the planned route creating unit 3 creates a planned route in an area other than the partial area.

Further, not only the vehicle control system 1a of the self-driving vehicle A but also the vehicle control system 1b of the other self-driving vehicle B creates a non-traveling area plan and transmits the non-traveling area plan.

The receiving unit 32 receives the non-traveling area plan of the self-driving vehicle B and the identification information of the self-driving vehicle B, which the vehicle control system 1b of the other self-driving vehicle B has broadcasted.

The partial area specifying unit 34 specifies a partial area which is an area within the non-traveling area indicated by the non-traveling area plan of the other self-driving vehicle B received by the receiving unit 32 and which is agreed with as the non-traveling area of the self-driving vehicle B. For example, the planned route creating unit 3 of the self-driving vehicle A creates the planned route of the self-driving vehicle A within the non-traveling area indicated by the non-traveling area plan of the self-driving vehicle B. The partial area specifying unit 34 specifies a partial area including the planned route of the self-driving vehicle A in the non-traveling area indicated by the non-traveling area plan of the self-driving vehicle B. If the self-driving vehicle B does not travel in the specified area, the self-driving vehicle A can travel without being affected by the self-driving vehicle B.

The response transmission unit 33 transmits, as a response to the non-traveling area plan of the self-driving vehicle B received by the receiving unit 32, the information on the partial area (partial area of the non-traveling area of the self-driving vehicle B) specified by the partial area specifying unit 34 to the self-driving vehicle B by the unicast method.

The response received by the response receiving unit 9 from the self-driving vehicle B is information on the partial area when the partial area specifying unit 34*b* of the self-driving vehicle B has agreed with the partial area of the non-traveling area of the self-driving vehicle A.

The target setting unit 7, the planned route creating unit 3, the non-traveling area plan creating unit 4, the reference area setting unit 5, the transmission unit 6 (excluding hardware for communication), the response receiving unit 9 (excluding hardware for communication), the traveling control unit 8, the partial area specifying unit 34, the receiving unit 32 (excluding hardware for communication), and the response transmission unit 33 (excluding hardware for communication) are realized, for example, by a computer operating according to a vehicle control program. This computer is provided in a self-driving vehicle. In this case, the computer reads the vehicle control program from a program recording medium such as a program storage device included in the computer, and may operate as the target setting unit 7, the planned route creating unit 3, the non-traveling area plan creating unit 4, the reference area setting unit 5, the transmission unit 6, the response receiving unit 9, the traveling control unit 8, the partial area specifying unit 34, the receiving unit 32, and the response transmission unit 33 according to the vehicle control program. Note that hardware for communication (communication interface) is connected to the computer.

Figure 16:
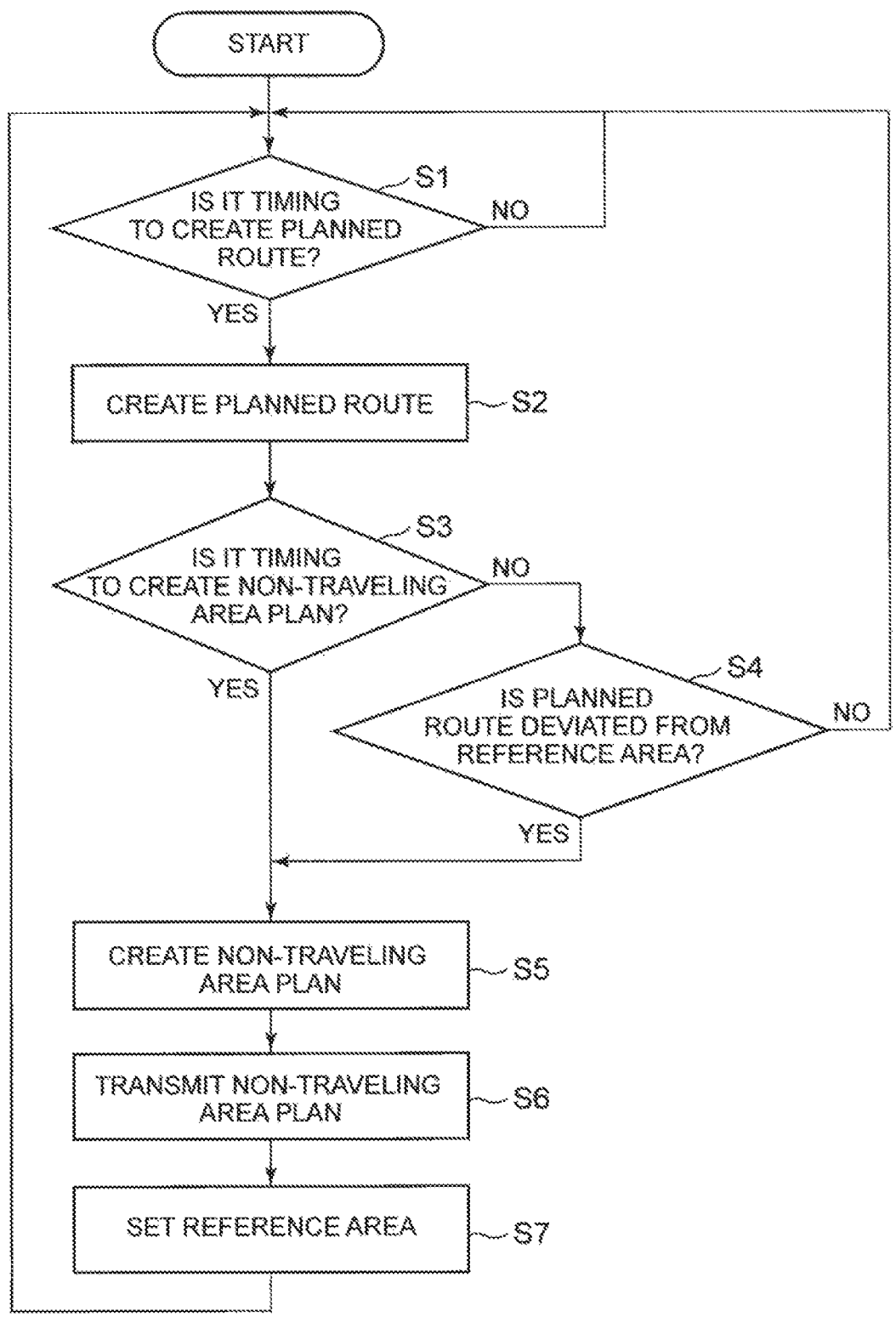
FIG. 16 It depicts a flowchart showing an example of a processing progress when creating a non-traveling area plan.

Next, the processing progress of the present invention will be described. FIG. 16 is a flowchart showing an example of a processing progress when creating a non-traveling area plan. In addition, since the operation of each element of the vehicle control system 1 is already described, the detailed description of the operation is omitted here. Further, steps S1 to S7 shown in FIG. 16 are repetitive processing, and the description will be provided assuming that the reference area is set in step S7 executed most recently.

The planned route creating unit 3 determines whether it is timing to create the planned route (step S1). If it is not the timing to create the planned route (No in step S1), the planned route creating unit 3 waits until the creation timing of the planned route.

When it is the timing to create a planned route (Yes in step S1), the planned route creating unit 3 creates the planned route (step S2).

Next, the non-traveling area plan creating unit 4 determines whether it is timing to create the non-traveling area plan (step S3). If it is the timing to create the non-traveling area plan (Yes in step S3), the process proceeds to step S5.

If it is not the timing to create the non-traveling area plan (No in step S3), the non-traveling area plan creating unit 4 determines whether the planned route created in step S2 is deviated from the reference area already set (step S4). If the planned route is deviated from the reference area (Yes in step S4), the process proceeds to step S5. If the planned route is not deviated from the reference area (No in step S4), the process returns to step S1.

When the process proceeds to step S5 from step S3 or step S4, the non-traveling area plan creating unit 4 creates a non-traveling area plan (step S5). The non-traveling area plan creating unit 4 may create the non-traveling area plan on the basis of the planned route created in the latest step S2. Alternatively, the non-traveling area plan creating unit 4 may create the non-traveling area plan on the basis of a plurality of planned routes obtained in the process of setting the final planned route in the latest step S2.

Next, the transmission unit 6 broadcasts the non-traveling area plan (the non-traveling area for each time zone) created in step S5 and information including the self-driving vehicle A to self-driving vehicles in the vicinity (step S6).

Next, the reference area setting unit 5 sets a reference area on the basis of the planned route created in the latest step S2 (step S7). After step S7, the process returns to step S1.

Figure 17:
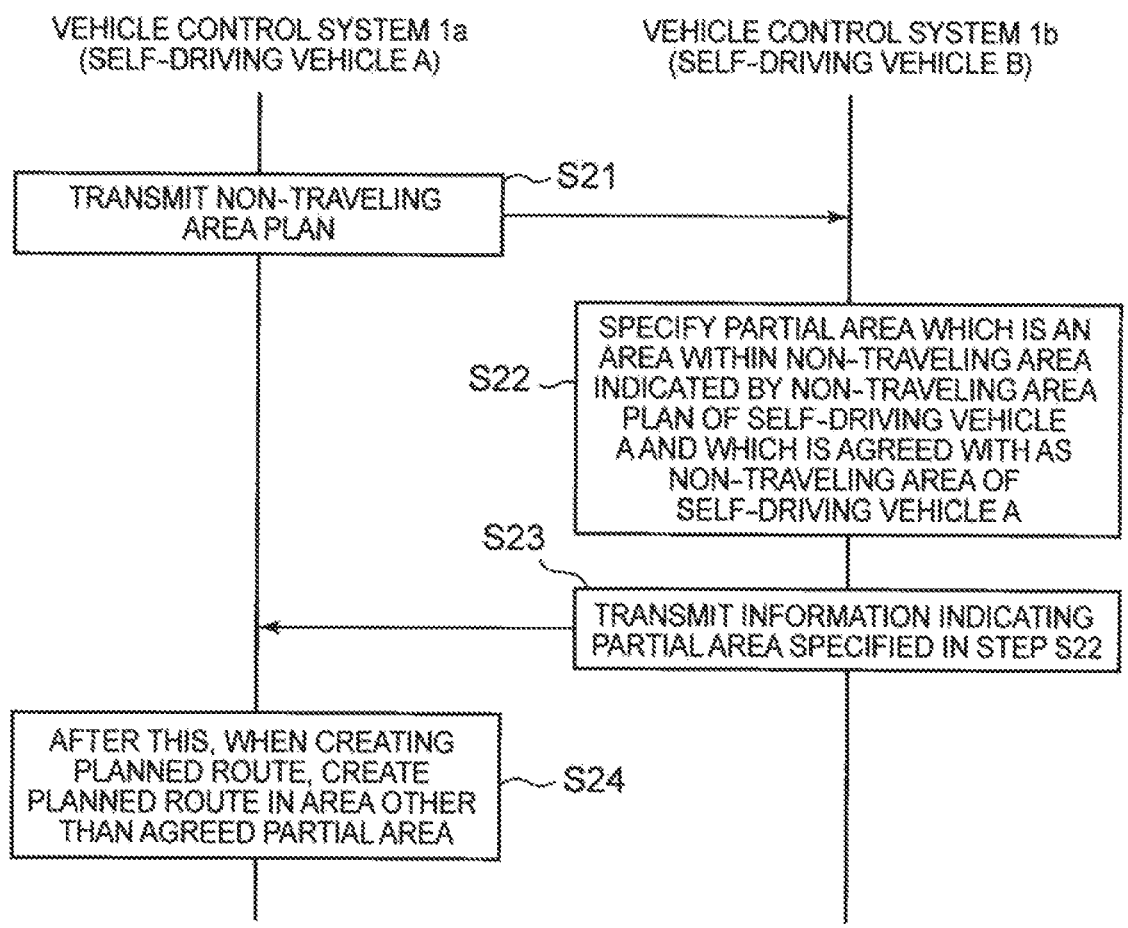
FIG. 17 It depicts a sequence diagram showing an example of a processing progress in the case of transmitting a non-traveling area plan by inter-vehicle communication.

Next, an example of a processing progress in the case of transmitting the non-traveling area plan by inter-vehicle communication will be described. FIG. 17 is a sequence diagram showing an example of the processing progress in this case. In the following description, the case where the self-driving vehicle A (vehicle control system 1*a*) transmits the non-traveling area plan of the self-driving vehicle A to the self-driving vehicle B (vehicle control system 1*b*) will be described as an example. The processing progress in the case where the self-driving vehicle B transmits the non-traveling area plan of the self-driving vehicle B to the self-driving vehicle A is the same.

Note that, it is assumed that the non-traveling area plan creating unit 4 of the vehicle control system 1*a* has already created the non-traveling area plan of the self-driving vehicle A.

The transmission unit 6*a* of the self-driving vehicle A broadcasts the non-traveling area plan and the identification information of the self-driving vehicle A to other self-driving vehicles existing in the vicinity (step S21).

The receiving unit 32*b* of the vehicle control system 1*b* receives the non-traveling area plan of the self-driving vehicle A and the identification information of the self-driving vehicle A transmitted in step S21.

The partial area specifying unit 34*b* of the vehicle control system 1*b* specifies a partial area which is an area within the non-traveling area indicated by the non-traveling area plan of the self-driving vehicle A and which is agreed with as the non-traveling area of the self-driving vehicle A (step S22).

Figure 18:
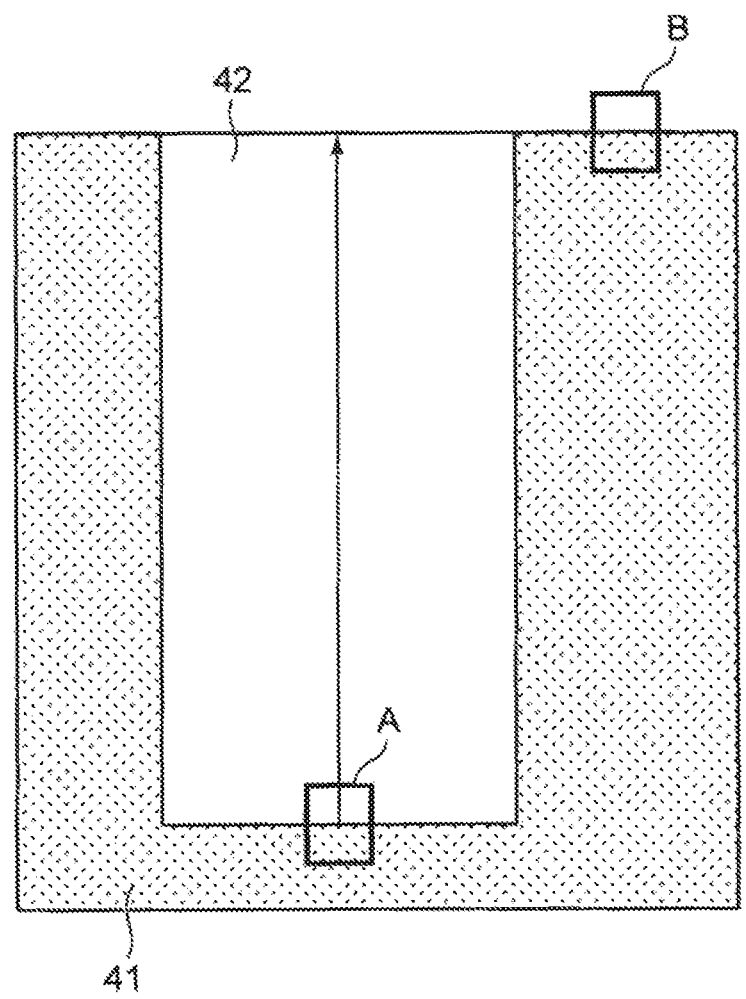
FIG. 18 It depicts a schematic diagram showing an example of the non-traveling area shown by the non-traveling area plan of the self-driving vehicle A.

FIG. 18 is a schematic diagram showing an example of a non-traveling area indicated by the non-traveling area plan of the self-driving vehicle A. FIG. 18 schematically illustrates also the self-driving vehicles A and B. An area 41 is a non-traveling area of the self-driving vehicle A. Further, an area 42 is an area other than a non-traveling area 41 of the self-driving vehicle A in a travelable area of the self-driving vehicle A.

In step S22, the planned route creating unit 3*b* of the vehicle control system 1*b* creates a planned route of the self-driving vehicle B in the non-traveling area 41 of the self-driving vehicle A. The partial area specifying unit 34*b* specifies a partial area (a partial area of the non-traveling area 41 of the self-driving vehicle A) including the planned route of the self-driving vehicle B.

Figure 19:
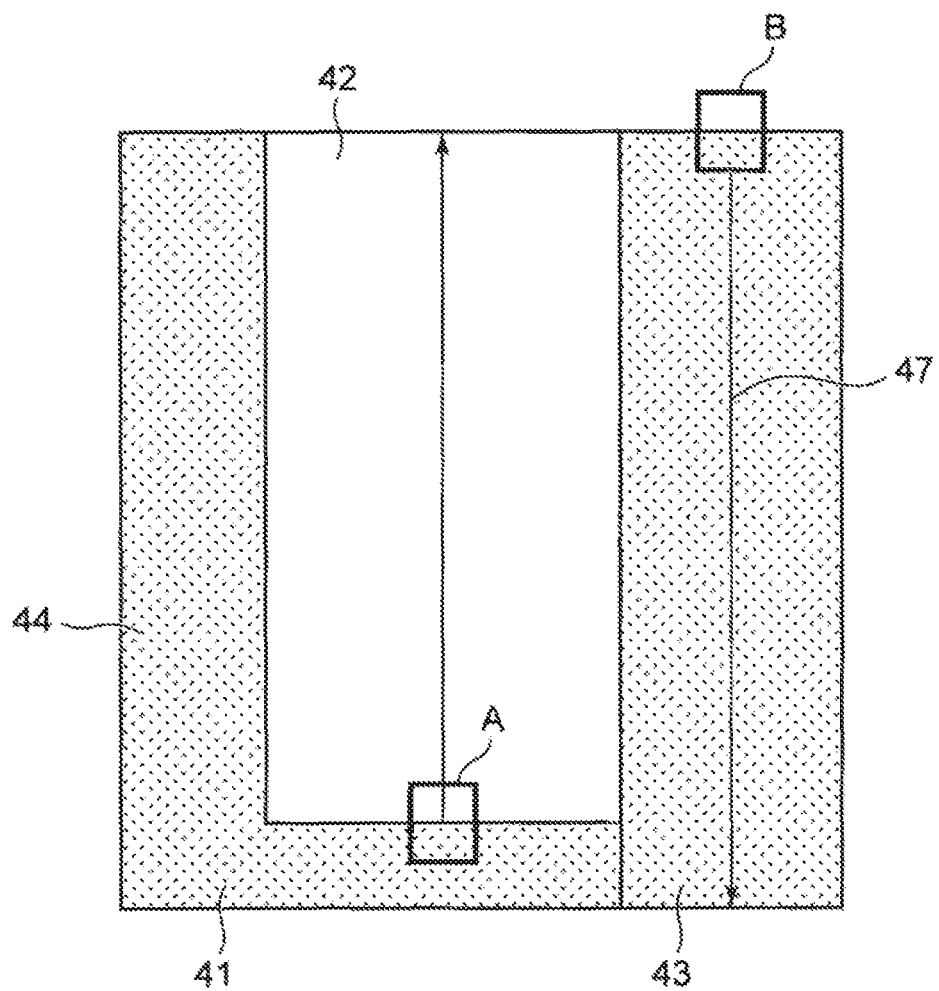
FIG. 19 It depicts a schematic diagram showing an example of a partial area including a planned route of a self-driving vehicle B.

FIG. 19 is a schematic diagram showing an example of a partial area including the planned route of the self-driving vehicle B. It is assumed that the planned route creating unit 3*b* has created a planned route 47 (see FIG. 19) of the self-driving vehicle B. The partial area specifying unit 34*b* specifies a partial area including the planned route 47 of the self-driving vehicle B as a partial area in the non-traveling area 41 of the self-driving vehicle A. The partial area specifying unit 34*b* specifies, for example, a partial area 43 (see FIG. 19) including the planned route 47 of the self-driving vehicle B as a partial area in the non-traveling area 41. Then, the partial area specifying unit 34*b* sets the partial area 43 as a partial area which the self-driving vehicle B agrees with as a non-traveling area of the self-driving vehicle A.

After step S22, the response transmission unit 33b of the vehicle control system 1b transmits information indicating the partial area specified in step S22 to the self-driving vehicle A by the unicast method as a response to the non-traveling area plan (step S23).

The response receiving unit 9a of the vehicle control system 1a receives the information indicating the partial area transmitted in step S23. It follows from this that the vehicle control system 1a has transmitted (presented) the non-traveling area plan of the self-driving vehicle A to the other self-driving vehicle B, and received agreement of the self-driving vehicle B on a partial area (partial area) in the non-traveling area as a non-traveling area of the self-driving vehicle A. As a result, the self-driving vehicle A has an obligation not to travel in the partial area. In the example shown in FIG. 19, the vehicle control system 1a presented the non-traveling area 41 of the self-driving vehicle A to the self-driving vehicle B, and obtained agreement of the self-driving vehicle B on the partial area 43 as the non-traveling area of the self-driving vehicle A. Therefore, after the response receiving unit 9a receives the information indicating the partial area 43, the self-driving vehicle A has an obligation not to travel in the partial area 43. On the other hand, the self-driving vehicle B does not agree with an area 44 (see FIG. 19) other than the partial area 43 in the non-traveling area 41 presented by the vehicle control system 1a to the self-driving vehicle B as the non-traveling area of the self-driving vehicle A. Therefore, the obligation (limitation) not to travel in the area 44 does not occur in the self-driving vehicle A.

After the response receiving unit 9a receives the information indicating the partial area 43, the planned route creating unit 3a, when creating a planned route of the self-driving vehicle A, creates the planned route in the area other than the partial area 43 (in the example shown in FIG. 19, the area 42 and the area 44) (step S24).

Figure 20:
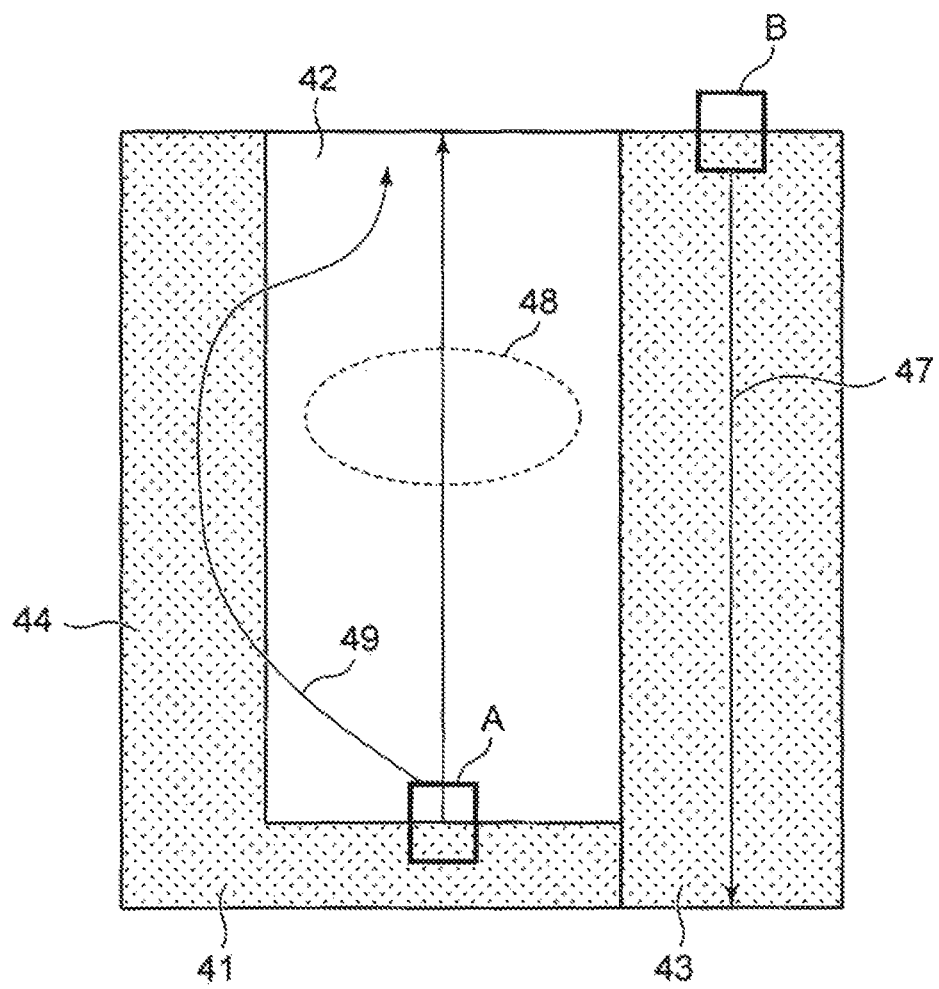
FIG. 20 It depicts a schematic diagram showing an example of a situation where the moving vehicle A has to change the planned route.

For example, as described above, it is assumed that the response receiving unit 9a has received the information indicating the partial area 43. Thereafter, it is assumed that the self-driving vehicle A has to change the planned route. FIG. 20 is a schematic diagram showing an example of a situation where the self-driving vehicle A has to change the planned route. FIG. 20 shows a situation where a fallen rock 48 has occurred on the planned route of the self-driving vehicle A, and the vehicle control system 1a has to change the mission and the planned route. Here, since the self-driving vehicle A has a limitation not to travel in the partial area 43, the target setting unit 7 sets a mission of avoiding the area of the fallen rock 48 without entering the partial area 43. Then, according to the mission, the planned route creating unit 3 sets a new planned route 49 not passing through the partial area 43 as an area other than the partial area 43 (see FIG. 20). The traveling control unit 8a causes the self-driving vehicle A to travel along the planned route 49. As a result, the self-driving vehicle A can travel while avoiding the area of the fallen rock 48. In addition, since the self-driving vehicle A does not enter the partial area 43, it can travel without affecting the self-driving vehicle B. As in the case of a mission, an event causing a change in a planned route may occur.

As in the first exemplary embodiment, when the self-driving vehicle A obtains the agreement of another self-driving vehicle B on the planned route, it must travel along the planned route. Therefore, in the case of the situation illustrated in FIG. 20, the self-driving vehicle A has difficulty in coping with the situation. On the other hand, in the second exemplary embodiment, it is preferable that the self-driving vehicle A does not travel into the partial area agreed with by the self-driving vehicle B in the non-traveling area presented to the self-driving vehicle B. Therefore, in the second exemplary embodiment, the degree of freedom in changing the mission and the planned route is large, and it is possible to easily cope with a sudden situation.

Also, in the second exemplary embodiment, the non-traveling area plan corresponds to the result of motion planning. Therefore, the vehicle control system 1 of the second exemplary embodiment does not receive the agreement of another self-driving vehicle on the mission itself, as in the first exemplary embodiment. The vehicle control system 1 according to the second exemplary embodiment presents the result of motion planning (non-traveling area plan) to the other self-driving vehicle B, and causes the host vehicle to travel so as not to enter the area agreed with as the non-traveling area. Therefore, as in the first exemplary embodiment, a smooth traffic flow can be realized.

Furthermore, in the second exemplary embodiment, the degree of freedom in changing a mission or a planned route is large, and it is easy to cope with a sudden situation. Since this point has already been described, the description is omitted here.

Note that, in the second exemplary embodiment, there may be a case where the partial area specifying unit 34 of the self-driving vehicle B that has received the non-traveling area plan of the self-driving vehicle A does not agree with the entire non-traveling area of the self-driving vehicle A. In that case, the vehicle control systems 1a and 1b may perform automatic negotiation on the non-traveling area of the self-driving vehicle A. However, the operation of the automatic negotiation in this case is not particularly limited. Also, the operation of the automatic negotiation in this case is outside the scope of the present invention.

Figure 21:
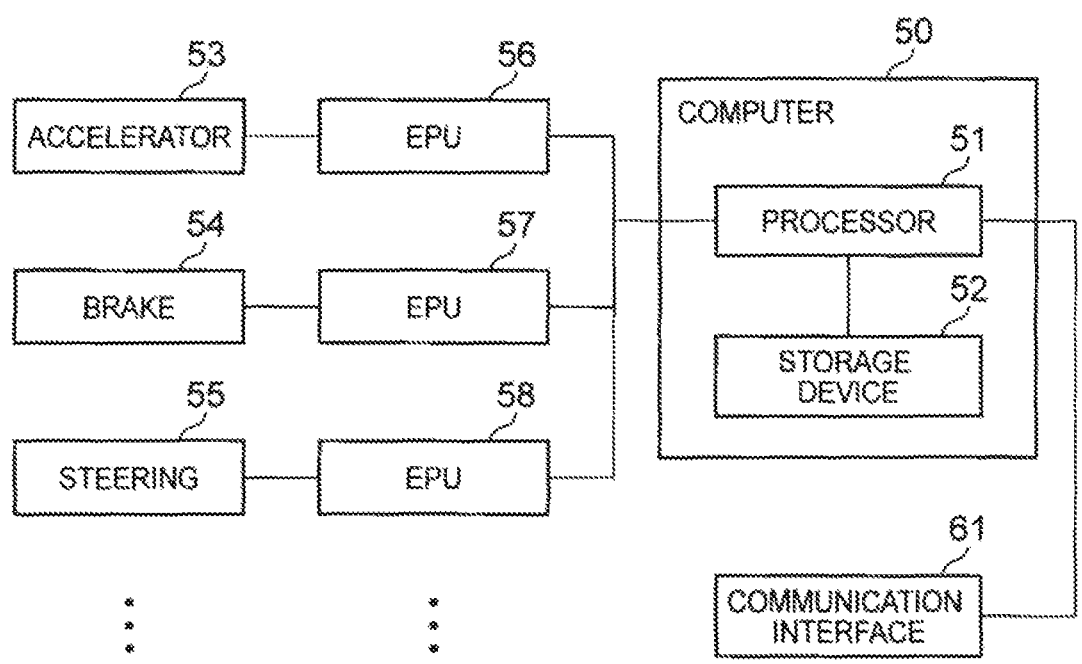
FIG. 21 It depicts a schematic diagram showing an example of a computer for realizing the vehicle control system of each exemplary embodiment of the present invention, and an element in a self-driving vehicle equipped with the computer.

FIG. 21 is a schematic diagram showing an example of a computer for realizing the vehicle control system 1 of each exemplary embodiment of the present invention, and an element in a self-driving vehicle equipped with the computer. The vehicle control system 1 of each exemplary embodiment of the present invention is realized by a computer 50. The computer 50 includes a storage device 52 and a processor 51. The operation of the vehicle control system 1 of the present invention is stored in the storage device 52 in the form of a program. The processor 51 reads the program from the storage device 52 and operates as the vehicle control system 1 according to the program.

The self-driving vehicle also includes a communication interface 61. The communication interface 61 is connected to the computer 50, and the processor 51 performs inter-vehicle communication via the communication interface 61.

Further, the processor 51 controls the self-driving vehicle so as to cause the self-driving vehicle to travel along the planned route. For example, the processor 51 outputs control information for controlling an accelerator 53 to an EPU (Electronic Control Unit) 56 corresponding to the accelerator 53, and controls the accelerator 53 via the EPU 56. Similarly, the processor 51 outputs control information for controlling a brake 54 to an EPU 57 corresponding to the brake 54, and controls the brake 54 via the EPU 57. Similarly, the processor 51 outputs control information for controlling a steering 55 to an EPU 58 corresponding to the steering 55, and controls the steering 55 via the EPU 58. Although the accelerator 53, the brake 54, and the steering 55 are illustrated in FIG. 21, the processor 51 similarly controls other elements in the self-driving vehicle.

Also, some or all of the components shown in FIG. 1 and FIG. 5 may be realized by general-purpose or dedicated circuitry, a processor, etc., or a combination thereof. These may be configured by a single chip or may be configured by a plurality of chips connected via a bus. Some or all of the components may be realized by a combination of the above-described circuitry and the like and a program.

Figure 22:
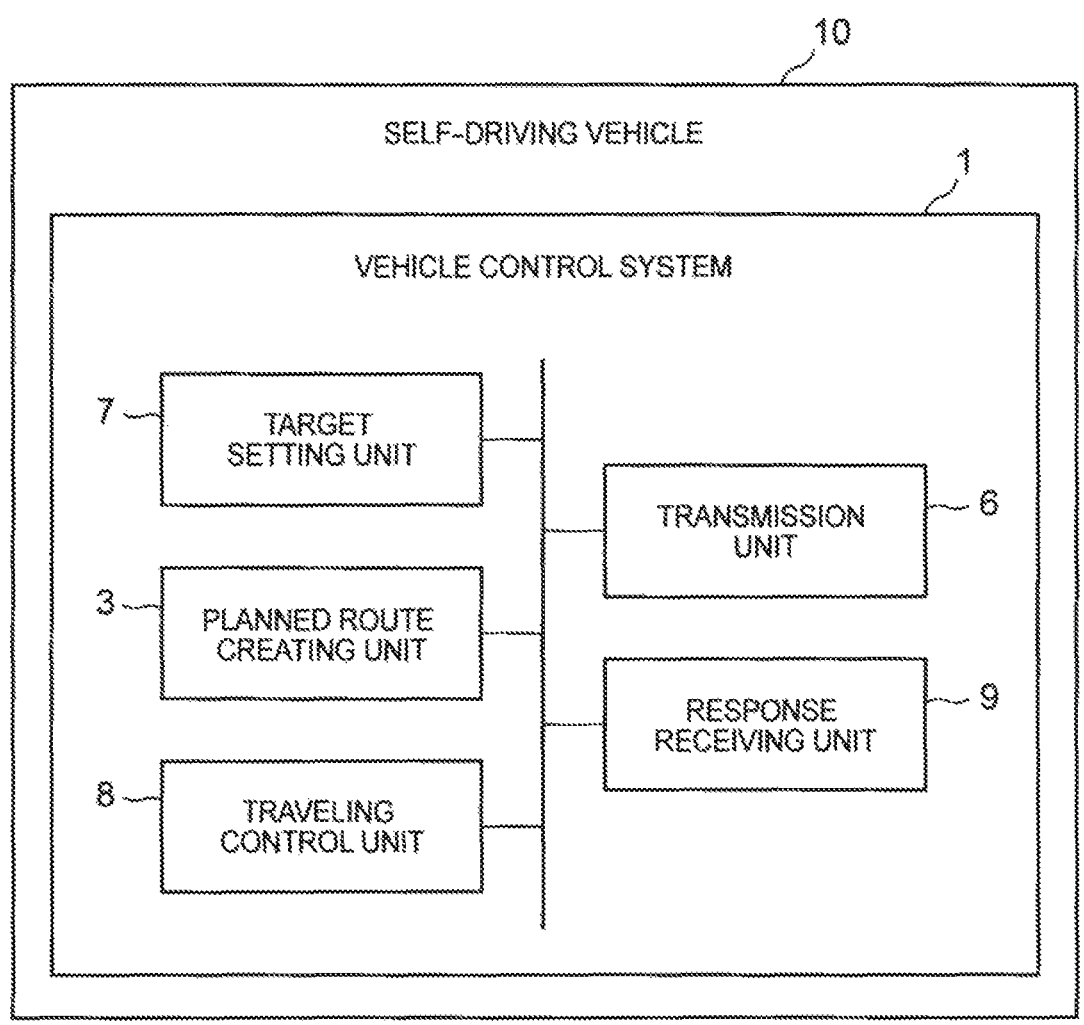
FIG. 22 It depicts a block diagram showing an outline of the present invention.

Next, an outline of the present invention will be described. FIG. 22 is a block diagram showing an outline of the present invention. The vehicle control system 1 of the present invention is provided in a self-driving vehicle 10. The vehicle control system 1 further includes a target setting unit 7, a planned route creating unit 3, a traveling control unit 8, a transmission unit 6, and a response receiving unit 9.

The target setting unit 7 sets a target state of the self-driving vehicle 10.

The planned route creating unit 3 creates a planned route of the self-driving vehicle 10 for realizing the target state.

The traveling control unit 8 controls the self-driving vehicle 10 so as to cause the self-driving vehicle 10 to travel along the planned route.

The transmission unit 6 transmits the planned route to another vehicle.

The response receiving unit 9 receives, from another vehicle, a notification indicating agreement with the planned route or disagreement with the planned route as a response to the planned route.

The traveling control unit 8 controls the self-driving vehicle 10 so as to cause the self-driving vehicle 10 to travel along the planned route when the response receiving unit 9 has received the notification indicating agreement with the planned route.

Such a configuration can realize a smooth traffic flow.

In addition, the planned route creating unit 3 may be configured to create the planned route again when the response receiving unit 9 has received the notification indicating disagreement with the planned route.

Also, a receiving unit (for example, the receiving unit 32) that receives the planned route created by another vehicle, a determination unit (for example, the determination unit 31) that determines whether to agree with the planned route of the other vehicle, and a response transmission unit (for example, the response transmission unit 33) that transmits, according to the determination result of the determination unit, a notification indicating agreement with the planned route of the other vehicle or disagreement with the planned route of the other vehicle to another vehicle, as a response to the planned route of the other vehicle, may be included, and the determination unit may be configured to determine whether to agree with the planned route of the other vehicle on the basis of the planned route of the other vehicle and the planned route created by the planned route creating unit.

Figure 23:
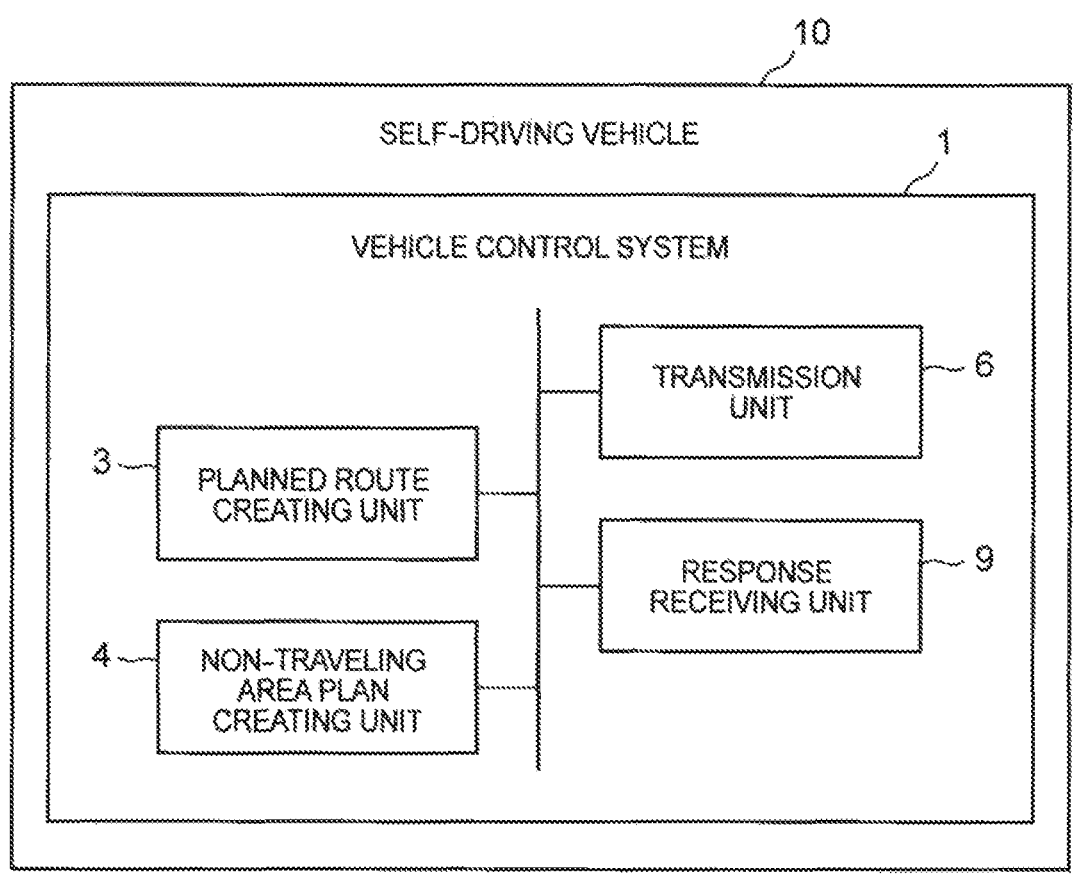
FIG. 23 It depicts a block diagram showing another example of the outline of the present invention.

FIG. 23 is a block diagram showing another example of the outline of the present invention. The vehicle control system 1 of the present invention is provided in a self-driving vehicle 10. In addition, the vehicle control system 1 includes a planned route creating unit 3, a non-traveling area plan creating unit 4, a transmission unit 6, and a response receiving unit 9.

The planned route creating unit 3 creates a planned route of the self-driving vehicle 10.

The non-traveling area plan creating unit 4 creates a plan of the non-traveling area, which is an area where the self-driving vehicle 10 can travel and which is an area set as an area where the self-driving vehicle 10 does not travel.

The transmission unit 6 transmits the plan of the non-traveling area to the other vehicle.

The response receiving unit 9 receives, from the other vehicle, information of a partial area which is an area within the non-traveling area and which the other vehicle has agreed with as the non-traveling area of the self-driving vehicle 10.

The planned route creating unit 3, when creating the planned route again after receiving the information on the partial area, creates the planned route in the area other than the partial area.

Such a configuration can realize a smooth traffic flow.

In addition, a receiving unit (for example, the receiving unit 32) that receives the plan of the non-traveling area created by another vehicle, a partial area specifying unit (for example, the partial area specifying unit 34) that specifies a partial area which is an area within the non-traveling area of the other vehicle and which is agreed with as the non-traveling area of the other vehicle, and a response transmission unit (for example, the response transmission unit 33) that transmits information on a partial area to another vehicle may be included.

Further, the non-traveling area plan creating unit 4 may be configured to create a plan of the non-traveling area on the basis of the planned route or a plurality of planned routes obtained in the process of creating the planned route.

The present invention may also be applied to unattended aerial vehicles. When the present invention is applied to an unattended aerial vehicle, the unattended aerial vehicles transmit and receive air areas.

INDUSTRIAL APPLICABILITY

The present invention is suitably applied to a vehicle control system mounted on a self-driving vehicle.

REFERENCE SIGNS LIST

1 Vehicle control system
2 Non-travelable area information storing unit
3 Planned route creating unit
4 Non-traveling area plan creating unit
5 Reference area setting unit
6 Transmission unit
7 Target setting unit
8 Traveling control unit
9 Response receiving unit
31 Determination unit
32 Receiving unit
33 Response transmission unit
34 Partial area specifying unit

What is claimed is:

1. A vehicle control system provided in a self-driving vehicle, the vehicle control system, comprising:
 at least one memory configured to store instructions; and
 at least one processor configured to execute the instructions to;
 create a planned route of the self-driving vehicle;
 create a plan of a non-traveling area, which is an area where the self-driving vehicle can travel and which is an area set as an area where the self-driving vehicle does not travel;
 transmit the plan of the non-traveling area to another vehicle; and receive, from the other vehicle, information on a partial area, which is an area within the non-traveling area and which the other vehicle has agreed with as the non-traveling area of the self-driving vehicle, wherein the at least one processor, when creating the planned route again after receiving the information on the partial area, creates the planned route in an area other than the partial area.

2. The vehicle control system according to claim 1, wherein:

the at least one processor is configured to;

receive a plan of a non-traveling area created by another vehicle;

specify a partial area which is an area within the non-traveling area of the other vehicle and which is agreed with as the non-traveling area of the other vehicle; and transmit information on the partial area to the other vehicle.

3. The vehicle control system according to claim 2, wherein the at least one processor creates the plan of the non-traveling area on a basis of the planned route or a plurality of planned routes obtained in a process of creating the planned route.

4. A self-driving vehicle comprising a vehicle control system according to claim 2.

5. The vehicle control system according to claim 1, wherein the at least one processor creates the plan of the non-traveling area on a basis of the planned route or a plurality of planned routes obtained in a process of creating the planned route.

6. A self-driving vehicle comprising a vehicle control system according to claim 5.

7. A self-driving vehicle comprising a vehicle control system according to claim 1.

8. A vehicle control method, by a computer provided in a self-driving vehicle, comprising:

creating a planned route of the self-driving vehicle;

creating a plan of a non-traveling area, which is an area where the self-driving vehicle can travel and which is an area set as an area where the self-driving vehicle does not travel;

transmitting the plan of the non-traveling area to another vehicle;

receiving, from the other vehicle, information on a partial area, which is an area within the non-traveling area and which the other vehicle has agreed with as the non-traveling area of the self-driving vehicle; and creating the planned route in an area other than the partial area when creating the planned route again after receiving the information on the partial area.

* * * * *